(12) United States Patent
Sotiropoulou et al.

(10) Patent No.: US 10,024,220 B2
(45) Date of Patent: *Jul. 17, 2018

(54) ACTIVE SCAVENGE PRECHAMBER

(71) Applicant: Prometheus Applied Technologies, LLC, Fort Collins, CO (US)

(72) Inventors: Maria Emmanuella Sotiropoulou, Fort Collins, CO (US); Luigi P. Tozzi, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/929,397

(22) Filed: Nov. 1, 2015

(65) Prior Publication Data

US 2016/0053673 A1 Feb. 25, 2016

Related U.S. Application Data

(63) Continuation-in-part of application No. 14/925,897, filed on Oct. 28, 2015, which is a continuation of
(Continued)

(51) Int. Cl.
*F02B 19/18* (2006.01)
*F02B 19/12* (2006.01)
(Continued)

(52) U.S. Cl.
CPC .......... *F02B 19/18* (2013.01); *F02B 19/1014* (2013.01); *F02B 19/12* (2013.01);
(Continued)

(58) Field of Classification Search
CPC ...... F02B 19/00; F02B 19/08; F02B 19/1004; F02B 19/1014; F02B 19/1019;
(Continued)

(56) References Cited

U.S. PATENT DOCUMENTS 1,930,003 A * 10/1933 Erny ....................... H01T 13/14
123/169 C
1,945,870 A * 2/1934 Stephenson ............. H01T 13/54
138/41
(Continued)

FOREIGN PATENT DOCUMENTS

WO 2012091739 A2 7/2012

OTHER PUBLICATIONS

PCT International Search Report of International Application No. PCT/US14/24904 filed on Mar. 12, 2014. 15 Pages.

*Primary Examiner* — Sizo Vilakazi
*Assistant Examiner* — Kevin R Steckbauer
(74) *Attorney, Agent, or Firm* — Barcelo, Harrison & Walker LLP

(57) ABSTRACT

In certain embodiments with large size prechambers and/or with prechambers that have large spark-gap electrode assemblies, a poor scavenge of the crevice volume may cause deterioration of the preignition margin, which then may limit the power rating of the engine, may cause the flow velocity field of the fuel-air mixture to be excessively uneven and may result in the deterioration of the misfire limit. One or more auxiliary scavenging ports may allow admission of fuel rich mixture to the crevice volume, thereby cooling the residual gases and preventing occurrence of preignition. More organized and powerful flow velocity fields may be obtained in the spark-gap electrode assembly region. This condition may result in a significant extension of the flammability limit and may significantly improve the combustion efficiency of the prechamber. Passive prechambers using the active scavenge concept may increase the engine power output and reduce the emission of pollutants from engine combustion.

45 Claims, 22 Drawing Sheets

Related U.S. Application Data application No. 14/207,029, filed on Mar. 12, 2014, now Pat. No. 9,850,068.

(60) Provisional application No. 61/778,266, filed on Mar. 12, 2013.

(51) Int. Cl.
  *F02P 13/00* (2006.01)
  *F02B 19/10* (2006.01)
  *F02B 19/16* (2006.01)

(52) U.S. Cl.
  CPC .......... *F02P 13/00* (2013.01); *F02B 19/1023* (2013.01); *F02B 19/16* (2013.01); *Y02T 10/125* (2013.01)

(58) Field of Classification Search
  CPC ...... F02B 19/1061; F02B 19/12; F02B 19/16; F02B 19/18; F02P 9/00; F02P 13/00; H01T 13/54; F02M 57/06
  USPC ... 123/260, 266, 268, 287, 293, 297, 169 R, 123/169 EL
  See application file for complete search history.

(56) References Cited

U.S. PATENT DOCUMENTS

| | | | |
|---|---|---|---|
| 4,119,065 A * | 10/1978 | Noguchi | F02B 19/1066 123/262 |
| 4,128,081 A | 12/1978 | Noguchi | |
| 4,646,695 A * | 3/1987 | Blackburn | F02B 19/12 123/256 |
| 4,930,473 A | 6/1990 | Dietrich | |
| 5,555,867 A * | 9/1996 | Freen | F02B 19/08 123/260 |
| 7,243,634 B2 * | 7/2007 | Tourteaux | F02B 17/005 123/261 |
| 7,659,655 B2 * | 2/2010 | Tozzi | F02B 19/08 123/266 |
| 8,584,648 B2 * | 11/2013 | Chiera | H01T 13/54 123/253 |
| 8,839,762 B1 * | 9/2014 | Chiera | F02B 19/108 123/256 |
| 9,004,042 B2 * | 4/2015 | Tozzi | F02B 19/12 123/260 |
| 9,172,217 B2 * | 10/2015 | Hampson | H01T 13/54 |
| 9,850,806 B2 * | 12/2017 | Sotiropoulou | F02B 19/12 |
| 2004/0100179 A1 * | 5/2004 | Boley | H01T 13/54 313/143 |
| 2005/0211217 A1 * | 9/2005 | Boley | F02B 19/12 123/266 |
| 2011/0148274 A1 * | 6/2011 | Ernst | H01T 13/467 313/141 |
| 2014/0102404 A1 * | 4/2014 | Sotiropoulou | F02B 19/1014 123/260 |
| 2014/0261296 A1 * | 9/2014 | Sotiropoulou | F02B 19/12 123/260 |
| 2016/0047294 A1 * | 2/2016 | Sotiropoulou | F02B 19/12 123/260 |

* cited by examiner

ACTIVE SCAVENGE PRECHAMBER

I. CROSS-REFERENCE TO RELATED APPLICATIONS

This application is a continuation in part of U.S. patent application Ser. No. 14/925,897 entitled "Active Scavenge Prechamber," and filed Oct. 28, 2015; which is a continuation of U.S. patent application Ser. No. 14/207,029 entitled "Active Scavenge Prechamber," and filed Mar. 12, 2014, published as U.S. Patent Application Number 2014-0261296 A1; which claims priority to U.S. Patent Application No. 61/778,266, entitled "Active Scavenge Prechamber," and filed on Mar. 12, 2013; which is related to U.S. patent application Ser. No. 13/602,148 ('148 Application), entitled "Method and apparatus for achieving high power flame jets while reducing quenching and autoignition in prechamber spark plugs for gas engines," and filed on Sep. 1, 2012 and International Patent Application Number PCT/US2012/53568 ('568 Application), entitled "Method and apparatus for achieving high power flame jets while reducing quenching and autoignition in prechamber spark plugs for gas engines," and filed on Sep. 1, 2012, both of which claim priority to U.S. Patent Application No. 61/573,290 ('290 Application), entitled "Method and apparatus for achieving high power flame jets while reducing quenching and autoignition in prechamber spark plugs for gas engines," and filed on Sep. 3, 2011. This application is also related to International Patent Application Number PCT/US2011/002012 ('012 Application), entitled "Prechamber Ignition System," and filed on Dec. 30, 2011, which claims priority to U.S. Patent Application No. 61/460,337, entitled "High efficiency ricochet effect passive chamber spark plug," and filed on Dec. 31, 2010. The entirety of each of the foregoing patent applications is incorporated by reference herein to the extent consistent with the present disclosure.

II. FIELD OF THE INVENTION

The disclosure generally relates to systems and methods for an active scavenging prechamber, and more particularly to an active scavenging prechamber that improves the combustion efficiency of a prechamber, increases the engine power output and reduces the emission of pollutants from engine combustion.

III. BACKGROUND OF THE INVENTION

Large gas engines with cylinder bore diameter greater than 200 mm typically use fuel-fed, rich precombustion chambers to enhance flame propagation rate with lean air/fuel mixtures in the main combustion chamber. Passive prechambers for internal combustion engines defined as precombustion devices with no direct fuel admission may be used with gas engines. While these concepts have proven to be very effective in relatively small displacement engines and with not so massive spark-gap electrode assemblies, their performance with larger displacement, higher power density engines and with more massive spark-gap electrode assemblies needs to be substantially improved.

IV. BRIEF DESCRIPTION OF THE DRAWINGS

FIG. 1 depicts a passive precombustion chamber in accordance with certain embodiments.

FIGS. 2a-b depicts two exemplary passive precombustion chambers in accordance with certain embodiments.

V. DETAILED DESCRIPTION

Figure 1:
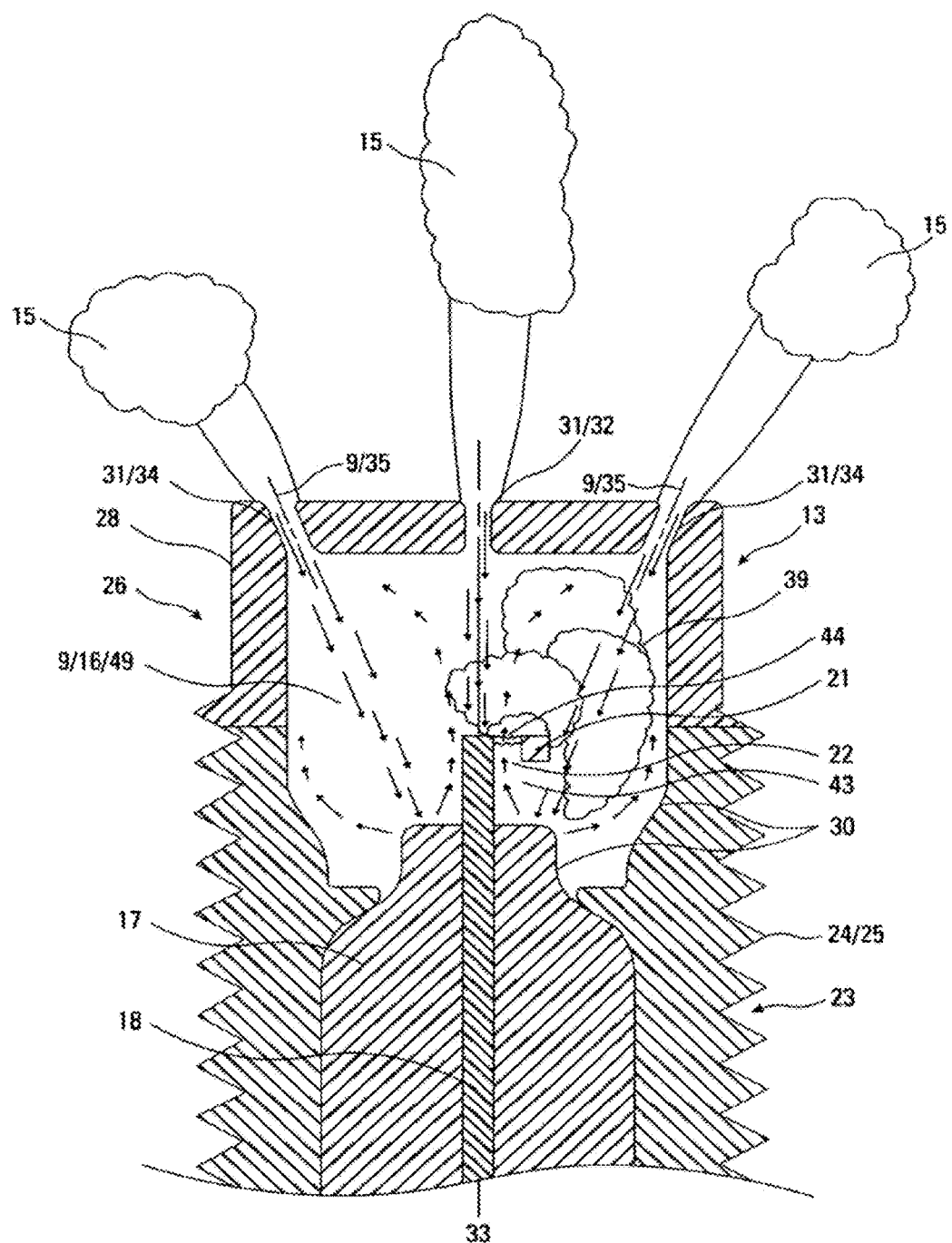

In certain embodiments, a pre-combustion chamber is disclosed comprising: a passive prechamber comprising: a prechamber comprising an external surface and an internal surface enclosing a prechamber volume; one or more ejection ports communicating between the external surface and the internal surface for introducing a fuel-air mixture into the prechamber volume; a crevice volume; and one or more auxiliary scavenging ports each comprising an inlet for communicating with a main combustion chamber and an outlet communicating with the crevice volume; wherein the prechamber is configured for removably receiving a spark plug comprising a primary electrode and one or more ground electrodes disposed within the prechamber volume and offset radially from the primary electrode to form one or more electrode gaps, such that the one or more electrode gaps are disposed within the prechamber volume. The one or more ground electrodes may comprise a single ground electrode offset radially from the primary electrode to form a single electrode gap. The prechamber may further comprise a first plurality of threads for removably engaging a second plurality of threads on the spark plug to removably attach the spark plug to the prechamber. The prechamber may be permanently affixed to an engine cylinder head. The prechamber may be configured to generate a flow velocity in the one or more electrode gaps of the spark plug that is substantially uniform in magnitude and direction when a fuel air mixture is ignited in the prechamber. The prechamber may be configured to direct a flow from the one or more electrode gaps of the spark plug away from quenching surfaces and toward one or more of the one or more holes when a fuel air mixture is ignited in the prechamber. The one or more auxiliary scavenging ports may be configured for admitting fresh fuel-air mixture directly to the crevice volume of the passive prechamber. The one or more auxiliary scavenging ports may have a length over diameter ratio greater than about 1. The one or more auxiliary scavenging ports may have a port axis substantially parallel to a longitudinal axis of the prechamber. The one or more auxiliary scavenging ports may be configured for inducing mixing of the fresh fuel-air mixture with residual gases in the passive prechamber. The one or more auxiliary scavenging ports may be configured for generating a uniform, high velocity flow within the one or more electrode gaps. The outlet of each of the one or more auxiliary scavenging ports may be proximate the one or more electrode gaps. The outlet of each of the one or more auxiliary scavenging ports may be proximate enough to the one or more electrode gaps to directly affect the flow fields into the crevice volume. The one or more auxiliary scavenging ports may be configured for generating a substantially reduced flame jet momentum from combustion in the passive prechamber.

In certain embodiments, a method of active scavenging is disclosed, comprising: providing a prechamber comprising: an external surface and an internal surface enclosing a prechamber volume; one or more ejection ports communicating between the external surface and the internal surface for introducing a fuel-air mixture into the prechamber volume; and one or more auxiliary scavenging ports each comprising an inlet for communicating with a main combustion chamber and an outlet communicating with a crevice volume of the prechamber; providing a spark plug comprising: a primary electrode; one or more ground electrodes offset radially from the primary electrode to form one or more electrode gaps; removably attaching the spark plug to the prechamber so that the one or more electrode gaps are disposed within the prechamber volume; and introducing one or more fuel-air in-filling streams to the prechamber volume through the one or more ejection ports; and introducing a spark across at least one of the one or more electrode gaps to ignite the fuel-air mixture. The one or more ground electrodes may comprise a single ground electrode offset radially from the primary electrode to form a single electrode gap. The prechamber may further comprise a first plurality of threads for removably engaging a second plurality of threads on the spark plug to removably attach the spark plug to the prechamber. The prechamber may be permanently affixed to an engine cylinder head. The prechamber may be configured to generate a flow velocity in the one or more electrode gaps of the spark plug that is substantially uniform in magnitude and direction when a fuel air mixture is ignited in the prechamber. The prechamber may be configured to direct a flow from the one or more electrode gaps of the spark plug away from quenching surfaces and toward one or more of the one or more holes when a fuel air mixture is ignited in the prechamber. The method may further comprise introducing one or more fresh fuel-air in-filling streams to the crevice volume through the one or more auxiliary scavenging ports. The one or more auxiliary scavenging ports may have a length over diameter ratio greater than about 1. The one or more auxiliary scavenging ports may have a port axis substantially parallel to a longitudinal axis of the prechamber. The outlet of at least one of the one or more auxiliary scavenging ports may be proximate enough to the one or more electrode gaps to directly affect the flow fields into the crevice volume. The one or more auxiliary scavenging ports may be configured for generating a substantially reduced flame jet momentum from combustion in the prechamber.

In certain embodiments, a pre-combustion chamber is disclosed comprising: a passive prechamber comprising: a prechamber comprising an external surface and an internal surface enclosing a prechamber volume; one or more ejection ports communicating between the external surface and the internal surface for introducing a fuel-air mixture into the prechamber volume; one or more electrode gaps, comprising a primary electrode disposed within the prechamber volume; and one or more ground electrodes disposed within the prechamber volume and offset from the primary electrode to form one or more electrode gaps; a crevice volume; and one or more auxiliary scavenging ports each comprising an inlet for communicating with a main combustion chamber and an outlet communicating with the crevice volume. The one or more ground electrodes may comprise a single ground electrode offset radially from the primary electrode to form a single electrode gap and wherein the one or more auxiliary scavenging ports comprises a single scavenging port. The one or more ground electrodes may comprise an electrode surface area greater than about 3 mm². The pre-combustion chamber may comprise an aspect ratio of length over diameter (L/D); and wherein for an L/D less than about 2, the single electrode gap is substantially radially aligned with the single scavenging port. The pre-combustion chamber may comprise an aspect ratio of length over diameter (L/D); and wherein for an L/D greater than about 2, the single electrode gap is aligned about 180° radially apart from the single scavenging port. The pre-combustion chamber may comprise an aspect ratio of length over diameter (L/D); and wherein for an L/D less than about 5, the single electrode gap is aligned between 0° and 180° radially apart from the single scavenging port. The single ground electrode may comprise an electrode surface area greater than about 3 mm². The prechamber may be configured to generate a flow velocity in the one or more electrode gaps of the spark plug that is less than about 100 m/s when a fuel air mixture is ignited in the prechamber. The prechamber may be configured to generate an average turbulent kinetic energy greater than 1 m²/s² when a fuel air mixture is ignited in the prechamber. The prechamber may be configured to generate a substantially uniform lambda distribution in the one or more electrode gaps of the spark plug when a fuel air mixture is ignited in the prechamber. The prechamber may be configured to generate a lambda fuel air mixture richer than about 2.5 in the one or more electrode gaps of the spark plug when a fuel air mixture is ignited in the prechamber. The prechamber may be configured to generate a lambda fuel air mixture richer than in a second region between the one or more electrode gaps of the spark plug and a bottom surface of the prechamber when a fuel air mixture is ignited in the prechamber. The prechamber may be configured to generate an average lambda value richer than about 2.5 in the prechamber when a fuel air mixture is ignited in the prechamber. The volume of the prechamber may be between about 1000 mm³ and about 6000 mm³ for use with fuels with energy content greater than about 800 BTU/ft³. The prechamber may have a total volume greater than about 1000 mm³ for use with fuels with energy content less than about 800 BTU/ft³. The prechamber may have a total volume less than about 6000 mm³ for use with fuels with Methane Number lower than about 60. The prechamber may have a total volume between about 1000 mm³ and about 6000 mm³ for use with fuels with Methane Number greater than about 60. The one or more auxiliary scavenging ports may be configured for admitting fresh fuel-air mixture directly to the crevice volume of the passive prechamber. The one or more auxiliary scavenging ports may have a length over diameter ratio greater than about 1. The one or more auxiliary scavenging ports may have a port axis substantially parallel to a longitudinal axis of the prechamber. The one or more auxiliary scavenging ports may be configured for inducing mixing of the fresh fuel-air mixture with residual gases in the passive prechamber. The one or more auxiliary scavenging ports may be configured for generating a uniform, high velocity flow within the spark-gap electrode assembly. The outlet of each of the one or more auxiliary scavenging ports may be proximate the spark-gap electrode assembly. The outlet of each of the one or more auxiliary scavenging ports may be proximate enough to the spark-gap electrode assembly to directly affect the flow fields into the crevice volume. The one or more auxiliary scavenging ports may be configured for generating a substantially reduced flame jet momentum from combustion in the passive prechamber.

In certain embodiments, a method of active scavenging is disclosed, comprising: providing a prechamber comprising: an external surface and an internal surface enclosing a prechamber volume; one or more ejection ports communicating between the external surface and the internal surface for introducing a fuel-air mixture into the prechamber volume; a spark-gap electrode assembly, comprising: a primary electrode disposed within the prechamber volume; and one or more ground electrodes disposed within the prechamber volume and offset from the primary electrode to form one or more electrode gaps; one or more auxiliary scavenging ports each comprising an inlet for communicating with a main combustion chamber and an outlet communicating with a crevice volume of the prechamber; introducing one or more fuel-air in-filling streams to the prechamber volume through the one or more ejection ports; and introducing a spark across at least one of the one or more electrode gaps to ignite the fuel-air mixture. The one or more ground electrodes may comprise a single ground electrode offset radially from the primary electrode to form a single electrode gap and wherein the one or more auxiliary scavenging ports comprises a single scavenging port. The one or more ground electrodes may comprise an electrode surface area greater than about 3 mm². The pre-combustion chamber may comprise an aspect ratio of length over diameter (L/D); and wherein for an L/D less than about 2, the single electrode gap is substantially radially aligned with the single scavenging port. The pre-combustion chamber may comprise an aspect ratio of length over diameter (L/D); and wherein for an L/D greater than about 2, the single electrode gap is aligned about 180° radially apart from the single scavenging port. The pre-combustion chamber may comprise an aspect ratio of length over diameter (L/D); and wherein for an L/D less than about 5, the single electrode gap is aligned between 0° and 180° radially apart from the single scavenging port. The single ground electrodes may comprise an electrode surface area of the precombustion chamber of greater than about 3 mm². The prechamber may be configured to generate a flow velocity in the one or more electrode gaps of the spark plug that is less than about 100 m/s when a fuel air mixture is ignited in the prechamber. The prechamber may be configured to generate an average turbulent kinetic energy greater than 1 m²/s² when a fuel air mixture is ignited in the prechamber. The prechamber may be configured to generate a substantially uniform lambda distribution in the one or more electrode gaps of the spark plug when a fuel air mixture is ignited in the prechamber. The prechamber may be configured to generate a lambda fuel air mixture richer than about 2.5 in the one or more electrode gaps of the spark plug when a fuel air mixture is ignited in the prechamber. The prechamber may be configured to generate a lambda fuel air mixture richer than in a second region between the one or more electrode gaps of the spark plug and a bottom surface of the prechamber when a fuel air mixture is ignited in the prechamber. The prechamber may be configured to generate an average lambda value richer than about 2.5 in the prechamber when a fuel air mixture is ignited in the prechamber. The volume of the prechamber may be between about 1000 mm³ and about 6000 mm³ for use with fuels with energy content greater than about 800 BTU/ft³. The prechamber may have a total volume greater than about 1000 mm³ for use with fuels with energy content less than about 800 BTU/ft³. The prechamber may have a total volume less than about 6000 mm³ for use with fuels with Methane Number lower than about 60. The prechamber may have a total volume between about 1000 mm³ and about 6000 mm³ for use with fuels with Methane Number greater than about 60. The method may further comprise introducing one or more fresh fuel-air in-filling streams to the crevice volume through the one or more auxiliary scavenging ports. The one or more auxiliary scavenging ports may have a length over diameter ratio greater than about 1. The one or more auxiliary scavenging ports may have a port axis substantially parallel to a longitudinal axis of the prechamber. The outlet of at least one of the one or more auxiliary scavenging ports may be proximate enough to the one or more electrode gaps to directly affect the flow fields into the crevice volume. The one or more auxiliary scavenging ports may be configured for generating a substantially reduced flame jet momentum from combustion in the prechamber.

Exemplary passive prechamber ("PPC") spark plugs are shown in FIG. 1 and FIG. 2. The passive prechamber spark plug shown in FIG. 1 is described and claimed in the '012 Application. FIG. 1 illustrates a pre-chamber unit providing a pre-combustion chamber (13). The pre-combustion chamber (13) can be formed by the shell (23) extending outwardly to at least partially enclose the central electrode (18) and the grounded electrode (21). As to particular embodiments, the pre-combustion chamber (13) can be formed by coupling a pre-combustion chamber element (26) to the base of the shell (23). The various embodiments of the pre-combustion chamber (13) can have a pre-combustion chamber wall (27) having pre-chamber external surface (28) disposed toward the internal volume of the main combustion chamber. The pre-combustion chamber internal surface (30) includes the corresponding internal surface of the shell (23), the pre-combustion chamber element (26), the central insulator (17), or other internal surfaces which enclose a pre-combustion chamber volume (29) (individually and collectively referred to as the "internal surface" (30)).

The internal surface (30) of the pre-combustion chamber (13) whether formed by extension of the shell (23) or by coupling of a pre-combustion chamber element (26) to the base of the shell (23), or otherwise, can further provide one or more induction-ejection ports (31) (also referred to as "scavenging ports") which communicate between the pre-combustion chamber external surface (28) and the pre-combustion chamber internal surface (30) of the pre-combustion chamber (13). The one or more scavenging ports (31) can be configured to transfer an amount of the fuel-oxidizer mixture (9) from the main combustion chamber into the pre-combustion chamber (13) and to deploy flame jets (15) from the pre-combustion chamber (13) into the main combustion chamber.

Combustion of the amount of fuel-oxidizer mixture (9) inside of the pre-combustion chamber (13) can be initiated by generation of a spark across the electrode gap (22). The scavenging ports (31) can be configured to deploy flame jets (15) into the main combustion chamber at a location which results in combustion of the amount of fuel-oxidizer mixture (9) within the main combustion chamber.

As shown in FIG. 1, flame growth (39) in a pre-combustion chamber (13) having a flow field (14). Firstly, flow field forces (16) in the electrode gap (22) can be sufficient to move the flame kernel (44) within the electrode gap (22) away from the internal surface (30) (for example, the central insulator (17) and shell (23)) which can impede, arrest, or slow (collectively "quench") flame growth (39). By reducing interaction or engulfment of the flame kernel (44) with the internal surface (30) of the pre-combustion chamber (13) that quenches flame growth (39) there can be a substantial increase in the rate of combustion of the fuel-oxidizer mixture (9) in the pre-combustion chamber (13). The movement of the flame kernel (44) toward greater fuel concentration inside of the pre-combustion chamber (13) can result in substantially increased combustion rates of the fuel-oxidizer mixture (9) inside of the pre-combustion chamber (13) and substantially greater momentum of flame jets (15) deployed into the main combustion chamber of an engine. The structure of the pre-combustion chamber (13) and scavenging ports (31) can achieve sufficient ricochet effect to generate embodiments of the inventive flow field (14) inside of the pre-combustion chamber (13) having sufficient flow field forces (16) to generate a counter flow region (43) in the electrode gap (22) and even extending about the first electrode (18) and the second electrode (21). An axial induction port (32) can be substantially axially aligned with the central longitudinal axis (33) of the pre-chamber unit (2). As to certain embodiments, one or more side induction ports (34) can be disposed in radial spaced apart relation about the central longitudinal axis (33).

Certain embodiments of the invention can provide both an axial induction port (32) and one or more side induction ports (34); however, the invention is not so limited, and particular embodiments of the invention may only provide an axial induction port (32) or only side induction ports (34) depending on the application. Upon compression of the amount of fuel-oxidizer mixture (9) in the main combustion chamber, a portion of the amount of fuel-oxidizer mixture (9) can pass through the axial induction port (32) and the side induction ports (34) as a corresponding one or more in-filling streams (35). The in-filling streams (35) of the fuel-oxidizer mixture (9) can create the flow field (14) having flow field forces (16) (shown in FIG. 1 by arrow heads pointing in the direction of flow and the velocity being greater with increasing length of the arrow body which allows comparison of conventional flow fields and inventive flow fields) inside of the pre-combustion chamber volume (29).

Figure 2A:
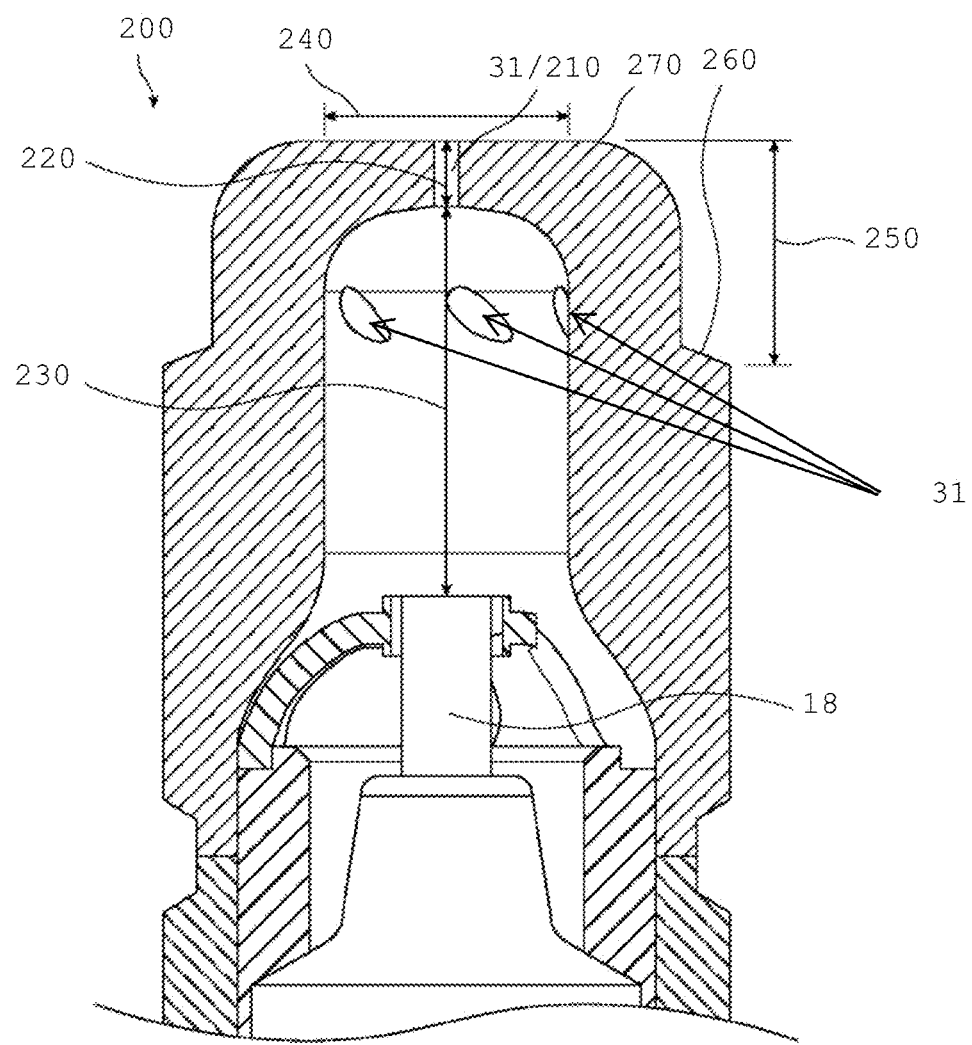

FIG. 2a shows an exemplary passive prechamber spark plug as described and claimed in the '568 Application. In certain embodiments as shown in FIG. 2a, pre-combustion chamber (200) may include a center induction port (210) with an induction port length (220). In certain embodiments, the center hole length may be from about 1 mm to about 13 mm. In certain embodiments, a pre-combustion chamber ceiling distance ("L") (230) from center electrode (18) may be from about 5 mm to about 85 mm. In certain embodiments, a pre-combustion chamber inner diameter ("D") (240) may be from about 4 mm to about 35 mm. In certain embodiments, a pre-combustion chamber insertion depth (250) from cylinder head firing deck (260) to the top (270) of the pre-combustion chamber (200) may be from about 0 mm to about 25 mm.

Figure 2B:
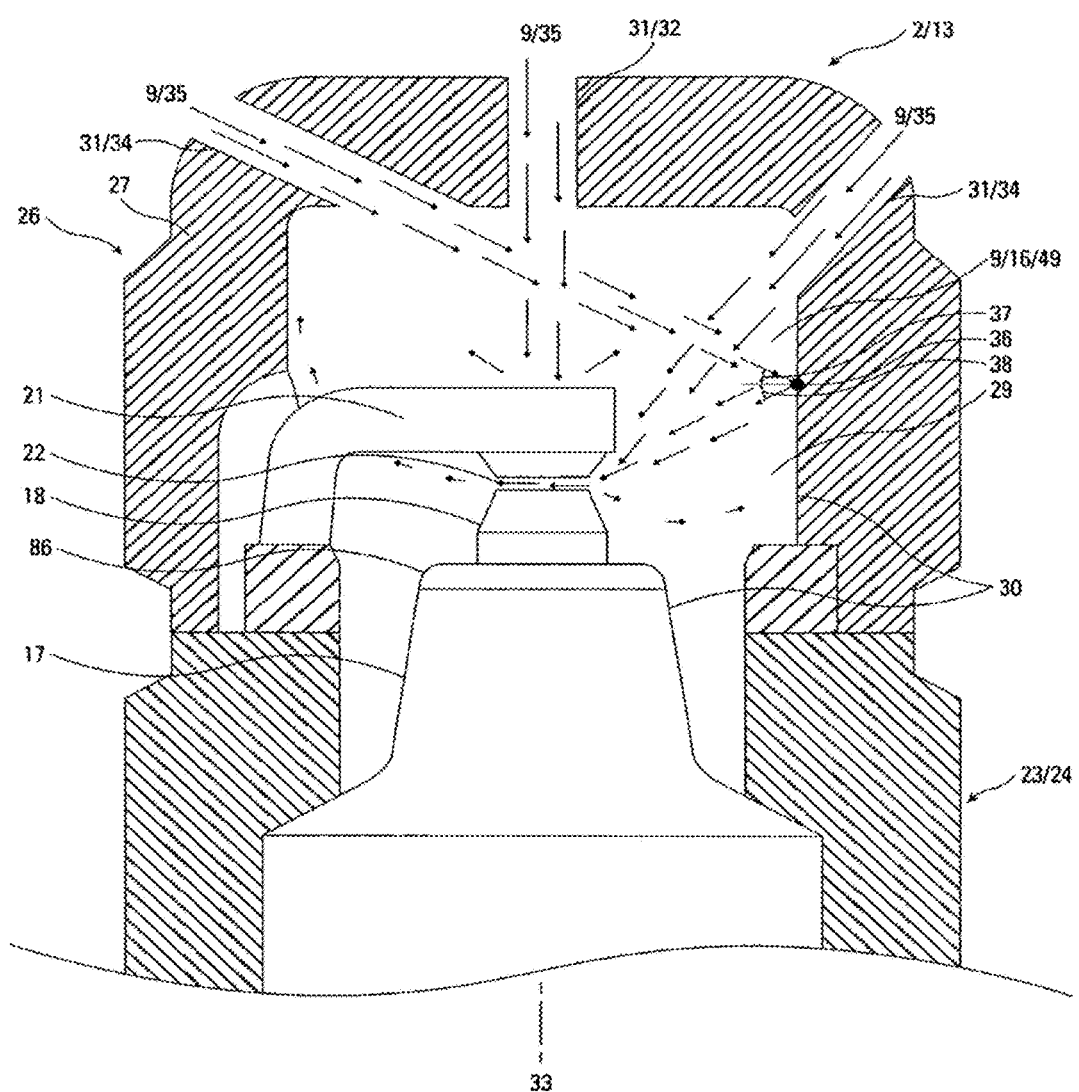

FIG. 2b shows an exemplary passive prechamber spark plug as described and claimed in the '012 Application. The arrows represent the directions and velocities of an embodiment of the inventive flow field forces (49) in the electrode gap (22) of a J-gap electrode in embodiments of the inventive pre-combustion chamber unit (13), which have achieved the ricochet effect in relation to the electrode gap (22) of a J-gap electrode. As shown, the inventive flow field forces (49) and the corresponding inventive flow field (14) can have comparatively greater organization or uniformity with the direction of flow of the fuel-oxidizer mixture (9) in substantially one direction, with greater velocity, and outward from the electrode gap (22) and quenching surfaces, or combinations thereof. This can reduce quenching of the flame kernel (44) (shown in FIG. 1) as there are sufficient flow field forces (16) to quickly move the flame kernel (44) away from the surfaces.

The pre-combustion chamber (13) and induction ports (31)(34) can be configured in regard to one or more aspects as above described to achieve ricochet of the in-filling streams (35) from one or more point locations (36) on the internal surface (30) of the pre-combustion chamber (13) which enclose a first electrode (18) and a second electrode (21) in a J-gap configuration. As shown, a particular embodiment can include an axial induction port (32), which directs an in-filling stream (35) toward the second electrode (21) (also referred to as a ground strap). One or more side induction ports (34) can be configured to direct in-filling streams (35) towards corresponding point locations (36) on the opposing internal surface (30) of the shell (23). The shell (23) may provide a shell external surface (24) configured to sealably mate with the cylinder head of the engine, typically by mated spiral threads (25) which draw the sealing surfaces together to dispose the pre-combustion chamber (13) of the pre-chamber unit (2) in proper relation to the main combustion chamber for ignition of the fuel-oxidizer mixture (9) therein. The configuration of the one or more side induction ports (34) can result in an angle of incidence (37) and an angle of deflection (38) in relation to the one or more point locations (36) to ricochet toward the electrode gap (22). Additionally one or more side induction ports (34) can be directed toward the electrode gap (22). The combined effect of the ricocheted and directed in-filling streams (35) can generate advantageous inventive flow field forces (49) and inventive flow fields (14) in the pre-combustion chamber (13) enclosing first and second electrodes (18)(21) in the J-gap form. The comparatively greater velocity of the fuel-oxidizer mixture (9) moving toward and approaching internal surface (30) of the pre-combustion chamber (13) (as shown in the example of FIG. 1), such as the central insulator (17) (including any one or more of the nose (86), lower corner of the nose, the side surface of the nose as shown in FIG. 2b), can upon ignition correspondingly move or locate the flame kernel (44) toward the quenching surfaces of the central insulator (17) as compared to the inventive flow field forces (16) which has a lesser velocity of the fuel-oxidizer mixture (9) moving toward and approaching the internal surface (30) of the pre-combustion chamber (13), which upon ignition comparatively locates the flame kernel (44) further away from quenching surface of the central insulator (17) (as shown in the example of FIG. 2b).

Figure 3:
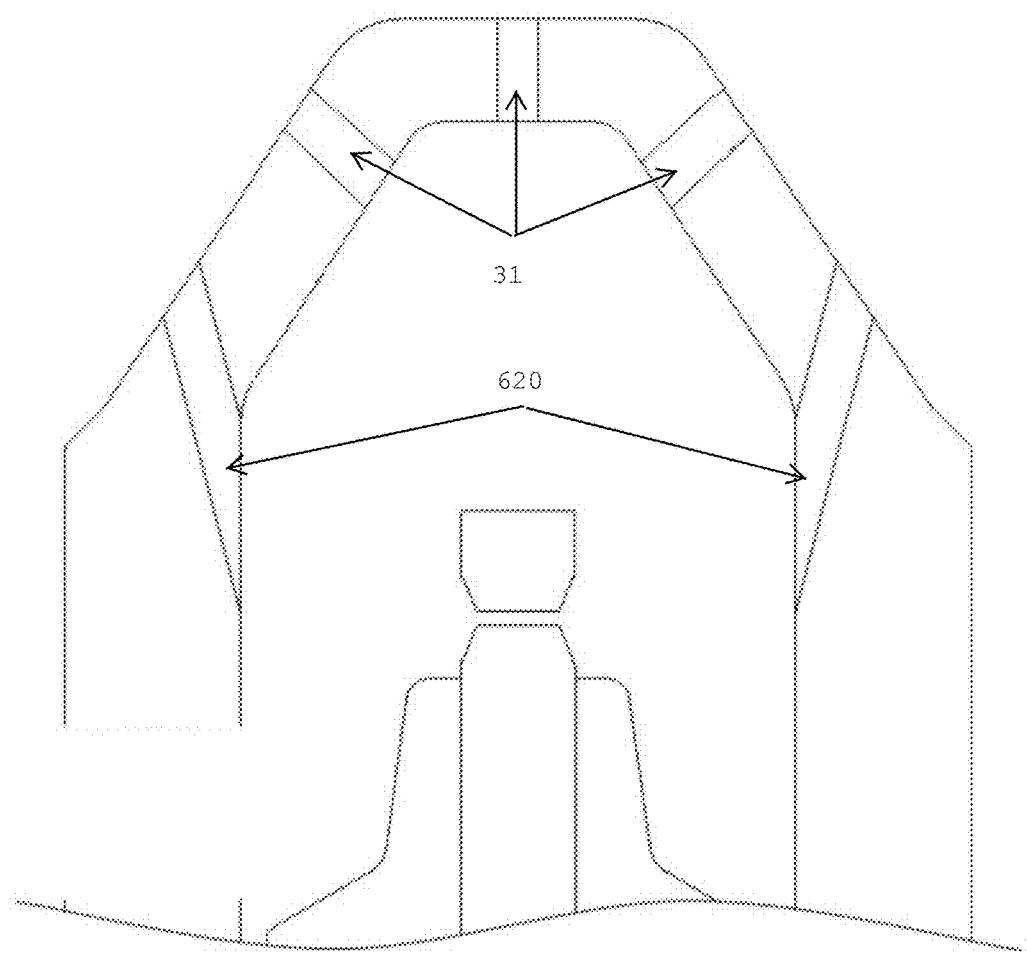
FIG. 3 depicts a prechamber spark plug with a large prechamber volume in accordance with certain embodiments.
Figure 4:
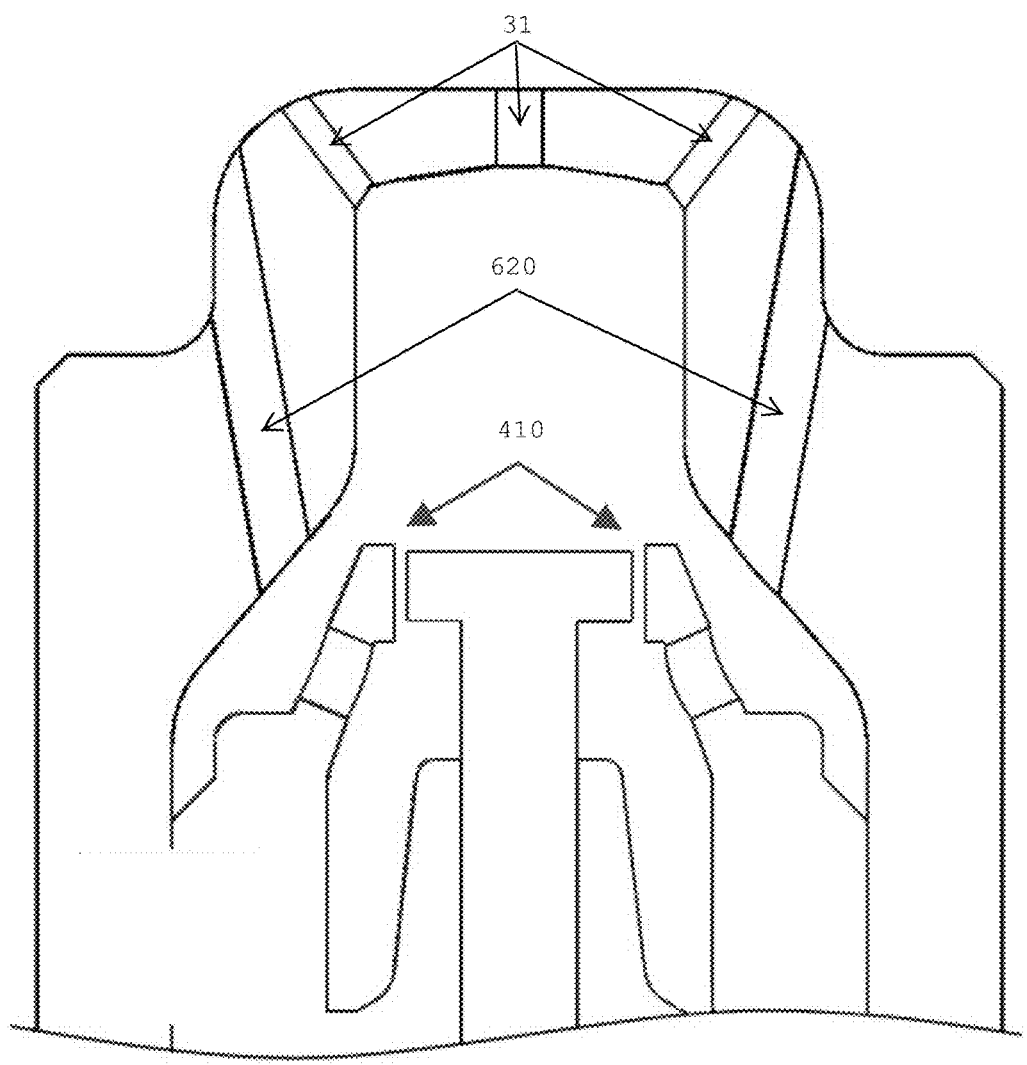
FIG. 4 depicts a prechamber spark plug with a large spark-gap electrode assembly in accordance with certain embodiments.
Figure 5:
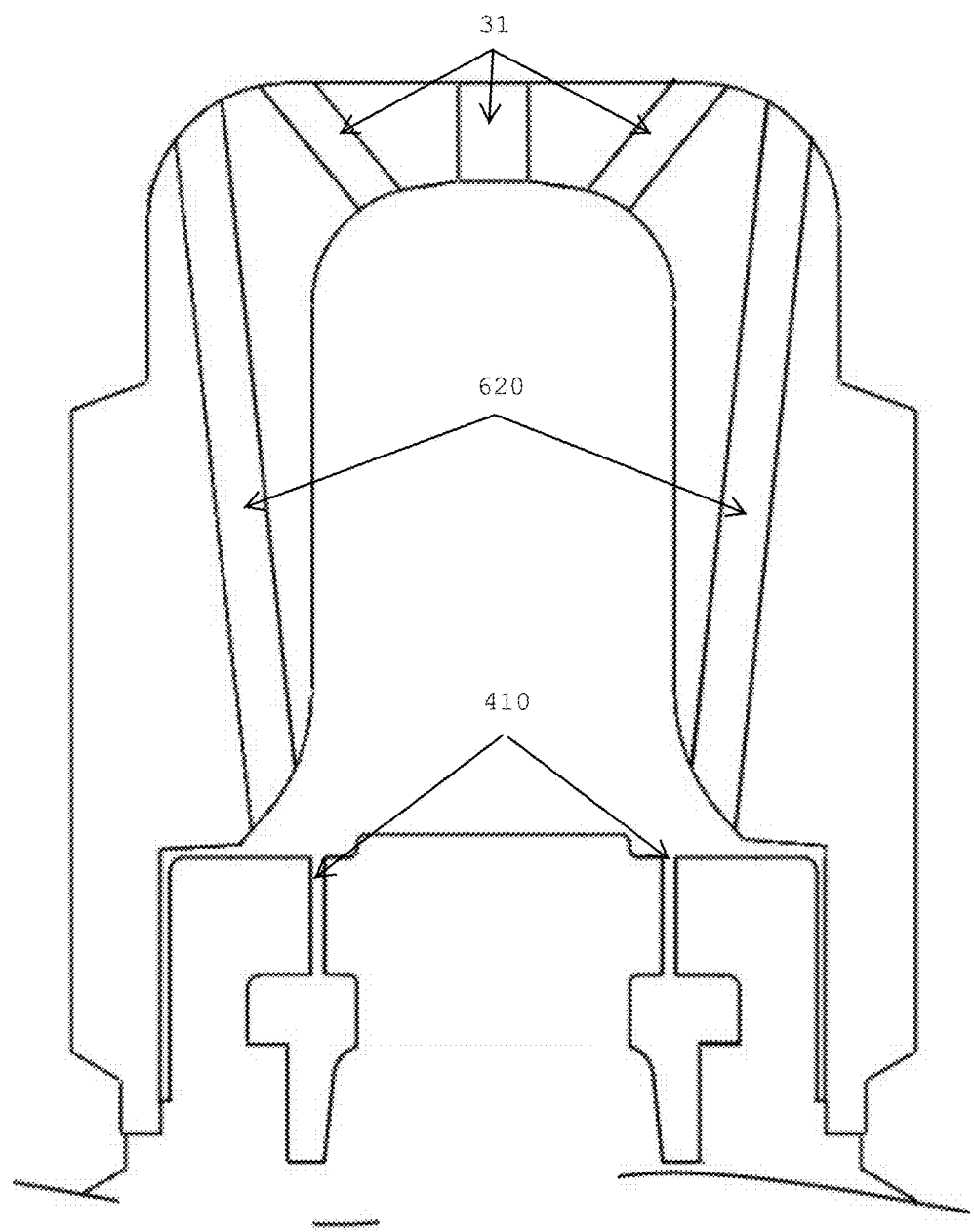
FIG. 5 depicts a prechamber spark plug with a large prechamber volume and a large spark-gap electrode assembly in accordance with certain embodiments.

Exemplary non-limiting examples of PPC spark plugs are disclosed in the related '148, '568, and '012 applications, which are incorporated by reference herein. In certain embodiments, improvements in performance can be achieved with larger prechamber volumes as shown in FIG. 3, or with larger spark-gap electrode assemblies (410) as shown in FIG. 4, or with combinations of larger prechamber volumes and larger spark-gap electrode assemblies as shown in FIG. 5. However, these configurations may have inadequate scavenging of the region remote from the scavenging/ejection ports. This condition can be significantly improved with the novel concept of "active scavenge" in accordance with certain embodiments.

Figure 6:
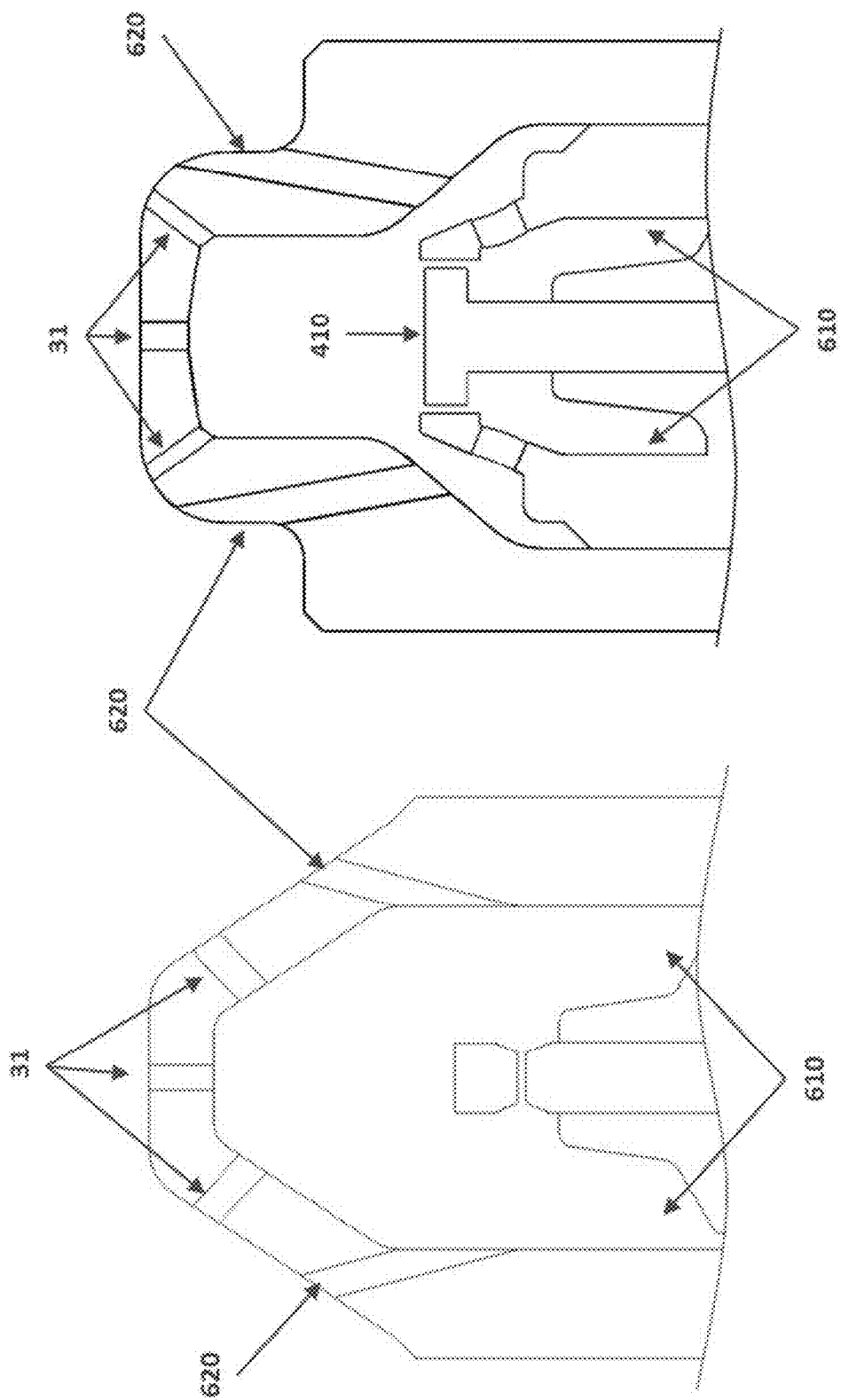
FIG. 6 depicts prechamber spark plugs including auxiliary scavenging ports in accordance with certain embodiments.
Figure 7:
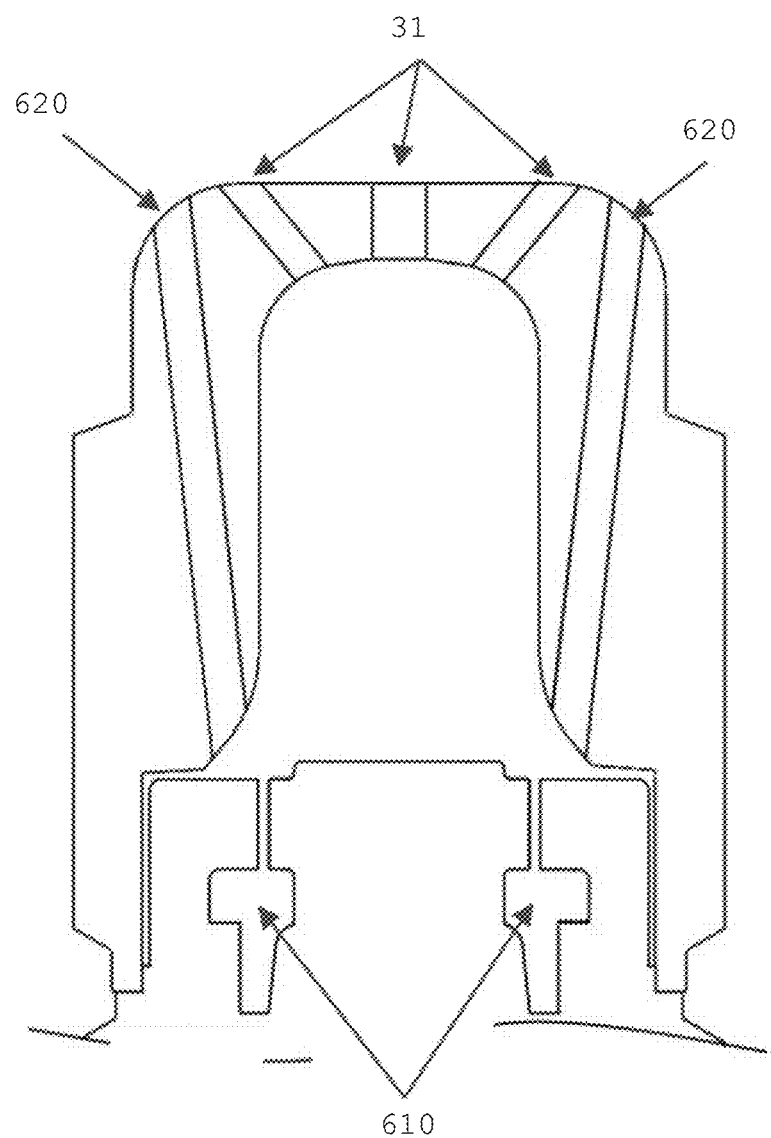
FIG. 7 depicts a prechamber spark plug with a large prechamber volume, a large spark-gap electrode assembly and auxiliary scavenging ports in accordance with certain embodiments.

In certain embodiments, the active scavenge concept may be based on creating auxiliary scavenging ports (620) for admitting fuel rich gas mixtures into the region of the prechamber that is opposite to the ejection ports and that is identified as the crevice volume (610) as shown in FIG. 6. In large volume prechambers and/or prechambers with large spark-gap electrode assembly, fuel rich gas mixtures, may only be obtained in regions adjacent to the ejection/scavenging ports. This condition may be improved with auxiliary scavenging ports that terminate in the region of otherwise poor scavenging. In certain embodiments, this region may be created by either the large spark-gap electrode assembly (410) as shown in the right schematic of FIG. 6, or by the large size of the prechamber and in the region that is remote from the conventional ejection/scavenging ports as shown in the left schematic of FIG. 6, or by the combination of large spark-gap electrode assembly and large prechamber volume as shown in FIG. 7.

Figure 8:
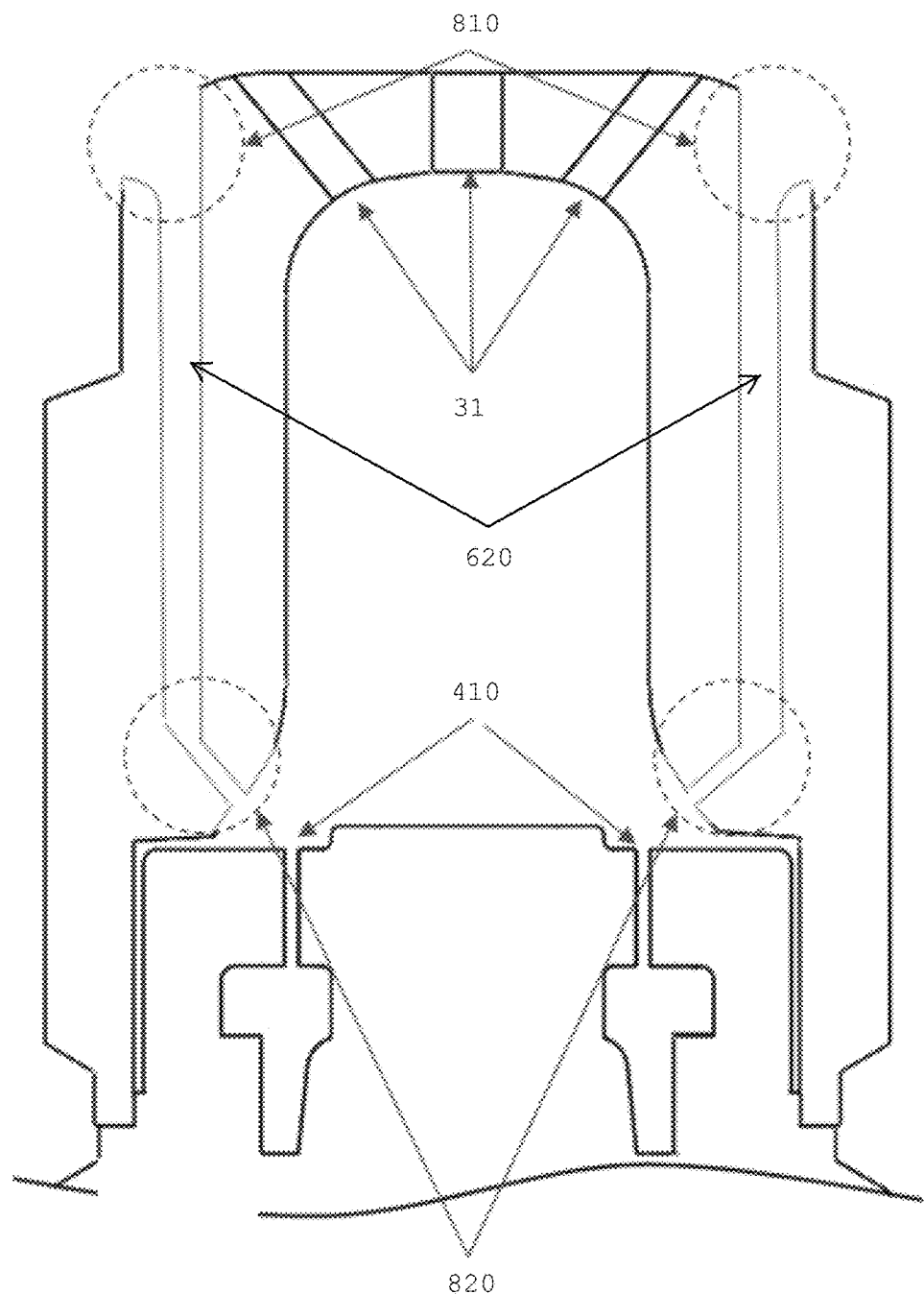
FIG. 8 depicts a prechamber spark plug including auxiliary scavenging ports with converging inlets and choked orifice areas in accordance with certain embodiments.

In certain embodiments, the auxiliary scavenging ports (620) may be configured to have a larger convergent inlet port and a smaller choked orifice area as shown in FIG. 8 in which sonic velocity is achieved during combustion in the prechamber. This configuration may provide the additional benefits of increasing the flow of fuel mixture admitted to the crevice volume (610) while minimizing the pressure drop during combustion in the prechamber. In certain embodiments, one or more auxiliary scavenging ports (620) may have a converging inlet area (810). In certain embodiments, one or more auxiliary scavenging ports (620) may have a choked orifice area (820).

In certain embodiments, larger prechamber volumes may be required to produce high power flame jets or with larger displacement engine cylinders. Also, larger spark-gap electrode assemblies may be required to improve durability in high power density engines. However, with large size prechambers and/or with prechambers that have large spark-gap electrode assembly, a poor scavenge of the crevice volume (610) may cause a significant deterioration of the preignition margin which then may limit the power rating of the engine. In certain embodiments, a poor scavenge of the crevice volume (610) may cause the flow velocity field of the fuel-air mixture distributions to be excessively uneven and may result in the deterioration of the misfire limit.

In certain embodiments, one or more auxiliary scavenging ports (620) may allow admission of fuel rich mixture to the crevice volume (610), thereby cooling the residual gases and preventing occurrence of preignition. In certain embodiments, more organized and powerful flow velocity fields may be obtained in the spark-gap electrode assembly region. This condition may result in a significant extension of the flammability limit and may significantly improve the combustion efficiency of the prechamber. In certain embodiments, passive prechambers using the active scavenge concept may increase the engine power output and reduce the emission of pollutants from engine combustion.

In certain embodiments, a pre-combustion chamber may comprise: a passive prechamber comprising: a prechamber comprising an external surface and an internal surface enclosing a prechamber volume; one or more ejection ports communicating between the external surface and the internal surface for introducing a fuel-air mixture into the prechamber volume; a spark-gap electrode assembly, comprising a primary electrode disposed within the prechamber volume; and one or more ground electrodes disposed within the prechamber volume and offset from the primary electrode to form one or more electrode gaps; a crevice volume (610); and one or more auxiliary scavenging ports (620) each comprising an inlet for communicating with a main combustion chamber and an outlet communicating with the crevice volume (610). The one or more auxiliary scavenging ports (620) may be configured for admitting fresh fuel-air mixture directly to the crevice volume (610) of the passive prechamber. The one or more auxiliary scavenging ports (620) may have a length over diameter ratio greater than about 1. The one or more auxiliary scavenging ports (620) may have a length over diameter ratio greater than about 3. The one or more auxiliary scavenging ports (620) may have a port axis substantially parallel to a longitudinal axis of the prechamber. At least one of the one or more auxiliary scavenging ports (620) has a converging inlet. The outlet of at least one of the one or more auxiliary scavenging ports (620) may comprise a choked orifice. The one or more auxiliary scavenging ports (620) may have an inlet axis defining an inlet angle and an outlet axis comprising an outlet angle, and the inlet angle may be different from the outlet angle. The one or more auxiliary scavenging ports (620) may be configured for inducing mixing of the fresh fuel-air mixture with residual gases in the passive prechamber. The one or more auxiliary scavenging ports (620) may be configured for generating a uniform, high velocity flow within the spark-gap electrode assembly. The outlet of each of the one or more auxiliary scavenging ports (620) may be proximate the spark-gap electrode assembly. The outlet of each of the one or more auxiliary scavenging ports (620) may be proximate enough to the spark-gap electrode assembly to directly affect the flow fields into the crevice volume (610). The outlet of each of the one or more auxiliary scavenging ports (620) may be remote from the one or more ejection ports. The one or more auxiliary scavenging ports (620) may be configured for generating a substantially reduced flame jet momentum from combustion in the passive prechamber. The one or more auxiliary scavenging ports (620) may be located at a periphery of the prechamber. The prechamber may define a prechamber volume of greater than about one thousand cubic millimeters. The spark-gap electrode assembly may have a volume greater than about 100 cubic millimeters.

In certain embodiments, a method of active scavenging may comprise: providing a prechamber comprising: an external surface and an internal surface enclosing a prechamber volume; one or more ejection ports communicating between the external surface and the internal surface for introducing a fuel-air mixture into the prechamber volume; a spark-gap electrode assembly, comprising: a primary electrode disposed within the prechamber volume; and one or more ground electrodes disposed within the prechamber volume and offset from the primary electrode to form one or more electrode gaps; and one or more auxiliary scavenging ports (620) each comprising an inlet for communicating with a main combustion chamber and an outlet communicating with a crevice volume (610) of the prechamber; introducing one or more fuel-air in-filling streams to the prechamber volume through the one or more holes; and introducing a spark across at least one of the one or more electrodes gaps to ignite the fuel-air mixture. The method may further comprise introducing one or more fresh fuel-air in-filling streams to the crevice volume (610) through the one or more auxiliary scavenging ports (620). The one or more auxiliary scavenging ports (620) may have a length over diameter ratio greater than about 1. The one or more auxiliary scavenging ports (620) may have a length over diameter ratio greater than about 3. The one or more auxiliary scavenging ports (620) may have a port axis substantially parallel to a longitudinal axis of the prechamber. At least one of the one or more auxiliary scavenging ports (620) may have a converging inlet. The outlet of at least one of the one or more auxiliary scavenging ports (620) may comprise a choked orifice. The one or more auxiliary scavenging ports (620) may have an inlet axis defining an inlet angle and an outlet axis comprising an outlet angle, and wherein the inlet angle is different from the outlet angle for at least one of the one or more auxiliary scavenging ports (620). The one or more auxiliary scavenging ports (620) may be configured for inducing mixing of the one or more fresh fuel-air in-filling streams with residual gases in the prechamber. The one or more auxiliary scavenging ports (620) may be configured for generating a uniform, high velocity flow within the spark-gap electrode assembly. The outlet of at least one of the one or more auxiliary scavenging ports (620) may be proximate the spark-gap electrode assembly. The outlet of each of the one or more auxiliary scavenging ports (620) may be proximate enough to the spark-gap electrode assembly to directly affect the flow fields into the crevice volume (610). The outlet of each of the one or more auxiliary scavenging ports (620) may be remote from the one or more ejection ports. The one or more auxiliary scavenging ports (620) may be configured for generating a substantially reduced flame jet momentum from combustion in the prechamber. The one or more auxiliary scavenging ports (620) may be located at a periphery of the prechamber. The prechamber may define a prechamber volume of greater than about one thousand cubic millimeters. The spark-gap electrode assembly may have a volume greater than about 100 cubic millimeters.

In certain embodiments, the design of the prechamber may be matched to the design of the spark plug electrode gap. In certain embodiments, the matching may take place by calculating the flow fields at the gap and within the prechamber and the resulting effects on flame quenching, rate of combustion and the electrodes wear rate. The term "matching" may mean that the geometry of the prechamber, in terms of all its parameters such as volume, aspect ratio, holes' diameter, penetration angle, rotational offset and so on, may be arranged with the use of Computational Fluid Dynamics (CFD) to create the most advantageous flow field and lambda distribution at the gap and within the prechamber. In certain embodiments, the term "most advantageous" may include one or more of the following characteristics:

The flow velocity in the gap may be substantially uniform in magnitude and direction.

The magnitude of the flow in the gap may be less than about 50 m/s.

The flow from the gap may be directed away from quenching surfaces and towards the prechamber exit orifices (holes).

The flow in the prechamber may have an average turbulent kinetic energy greater than about $1 \text{ m}^2/\text{s}^2$.

The lambda distribution in the gap may be substantially uniform.

The magnitude of lambda in the gap may be richer than about 2.5.

The lambda distribution in the prechamber may be richer in the region comprised between the gap and the exit orifices and leaner in the region comprised between the gap and the bottom of the prechamber.

The magnitude of the average lambda in the prechamber may be richer than about 2.5.

Figure 9:
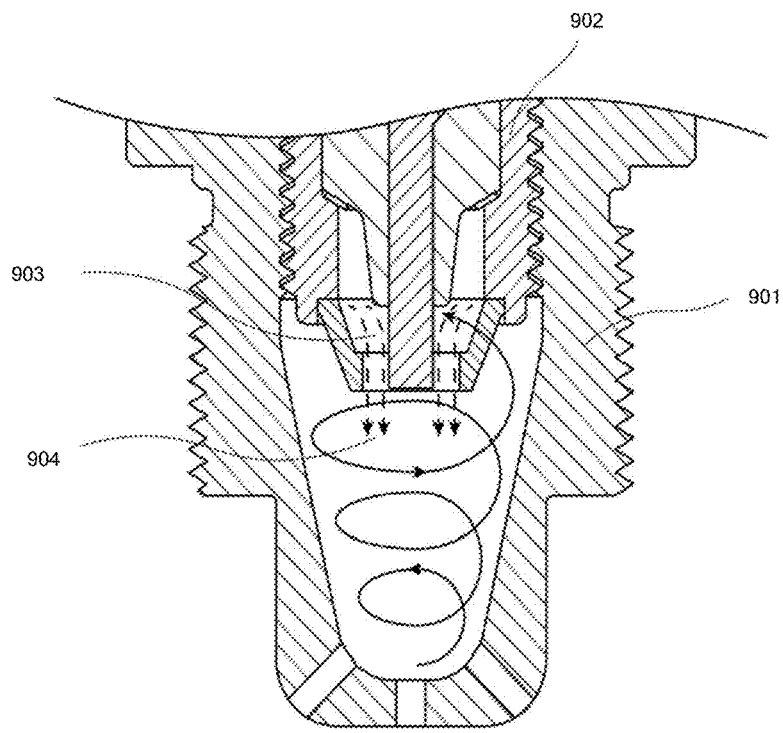
FIG. 9 depicts uniform flow velocity and magnitude in the gap of a permanent passive prechamber with a removable spark plug in accordance with certain embodiments.

In certain embodiments, FIG. 9 shows the uniform flow velocity and magnitude in the gap 903 of a permanent passive prechamber 901 with removable spark plug 902. It also shows that the flow from the gap may be directed away from quenching surfaces and towards the prechamber exit orifices/holes 904.

Figure 10:
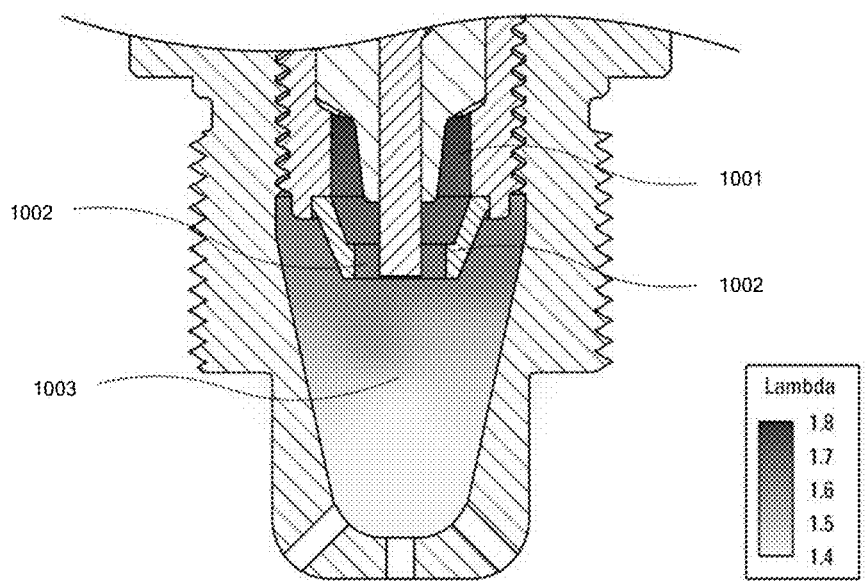
FIG. 10 depicts uniform Lambda distribution in the gap of a permanent passive prechamber with a removable spark plug in accordance with certain embodiments.

In certain embodiments, FIG. 10 shows uniform Lambda distribution 1002 in the gap of a permanent passive prechamber with a removable spark plug. It also shows Lambda stratification in the prechamber that is richer 1003 in the region comprised between the gap and the exit orifices and leaner 1001 in the region comprised between the gap and the bottom of the prechamber.

Figure 11:
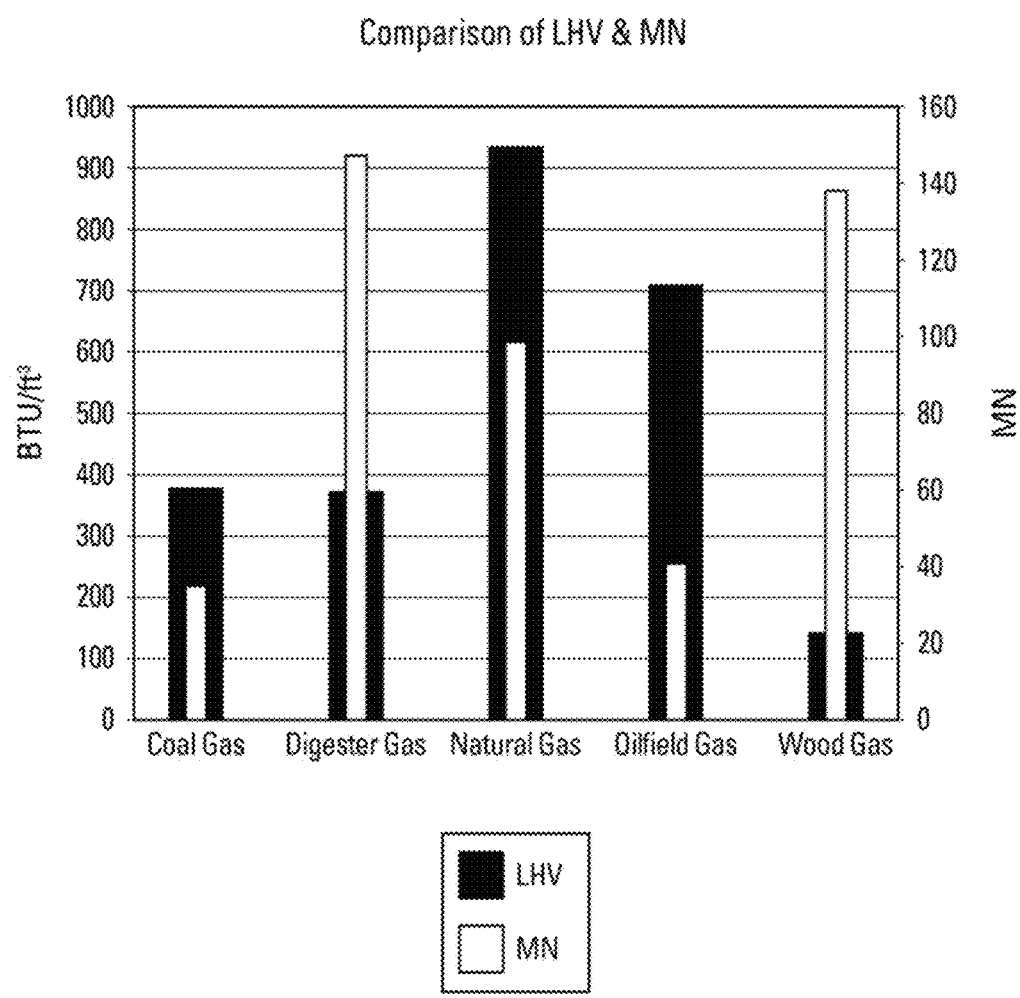
FIG. 11 depicts a correlation between the type of fuel, the Low Heating Value (LHV) and the fuel Methane Number (MN) in accordance with certain embodiments.

In certain embodiments, the spark plug and prechamber may be matched to the quality of the fuel. In certain embodiments, the aspect of matching the combination of spark plug design and forward flow prechamber design to the fuel quality defined as energy content (LHV) and propensity to knock (MN) is shown in FIG. 11. In certain embodiments, the matching may take place by calculating the flow fields at the gap and within the prechamber and the resulting effects on flame quenching, rate of combustion and electrodes wear rate. In certain embodiments, FIG. 11 shows a correlation between the type of fuel, the Low Heating Value (LHV) and the fuel Methane Number (MN).

Figure 12:
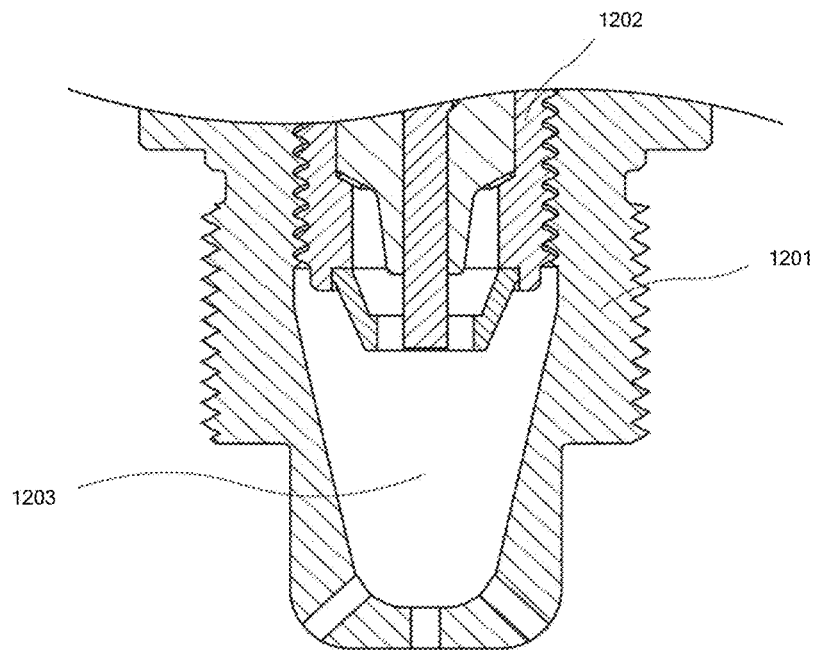
FIG. 12 depicts a permanent passive prechamber with removable spark plug for natural gas fueled engines in accordance with certain embodiments.
Figure 13:
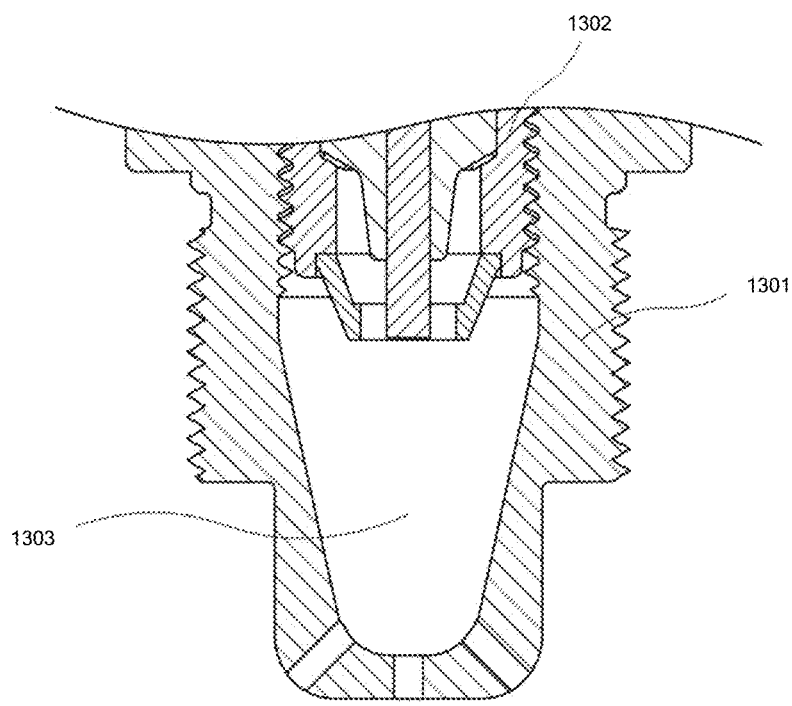
FIG. 13 depicts a permanent passive prechamber with removable spark plug for low BTU fueled engines in accordance with certain embodiments.

In certain embodiments, the term "matching" may mean that the geometry of the prechamber, in terms of all its parameters such as volume, aspect ratio, holes' diameter, penetration angle, rotational offset and so on, is arranged with the use of CFD to create the most advantageous flow field and lambda distribution at the gap and within the prechamber. The term "most advantageous" may include one or more of the following characteristics:

The flow velocity in the gap may be uniform in magnitude and direction.
The magnitude of the flow in the gap may be less than about 50 m/s.
The flow from the gap may be directed away from quenching surfaces and towards the prechamber exit orifices (holes).
The flow in the prechamber may have an average turbulent kinetic energy greater than about 1 $m^2/s^2$.
The lambda distribution in the gap may be uniform.
The magnitude of lambda in the gap may be richer than about 2.5.
The lambda distribution in the prechamber may be richer in the region between the gap and the exit orifices and leaner in the region between the gap and the bottom of the prechamber.
The magnitude of the average lambda in the prechamber may be richer than about 2.5.
For fuels with energy content greater than about 800 $BTU/ft^3$, the total volume of the prechamber may be in the range of about 1000-6000 $mm^3$ as shown in FIG. 12.
For fuels with energy content lower than about 800 $BTU/ft^3$, the total volume of the prechamber should be greater than about 1000 $mm^3$ as shown in FIG. 13.
For fuels with Methane Number (MN) greater than about 60, the total volume of the prechamber may be in the range of about 1000-6000 $mm^3$ as shown in FIG. 14.

In certain embodiments, FIG. 12 shows a permanent passive prechamber 1201 with removable spark plug 1202 for natural gas fueled engines with medium pre-chamber volume 1203 as compared to general configurations for the other types of fuels.

In certain embodiments, FIG. 13 shows a permanent passive prechamber 1301 with removable spark plug 1302 for low BTU fueled engines as with largest pre-chamber volume 1303 compared to general configurations for the other types of fuels.

Figure 14:
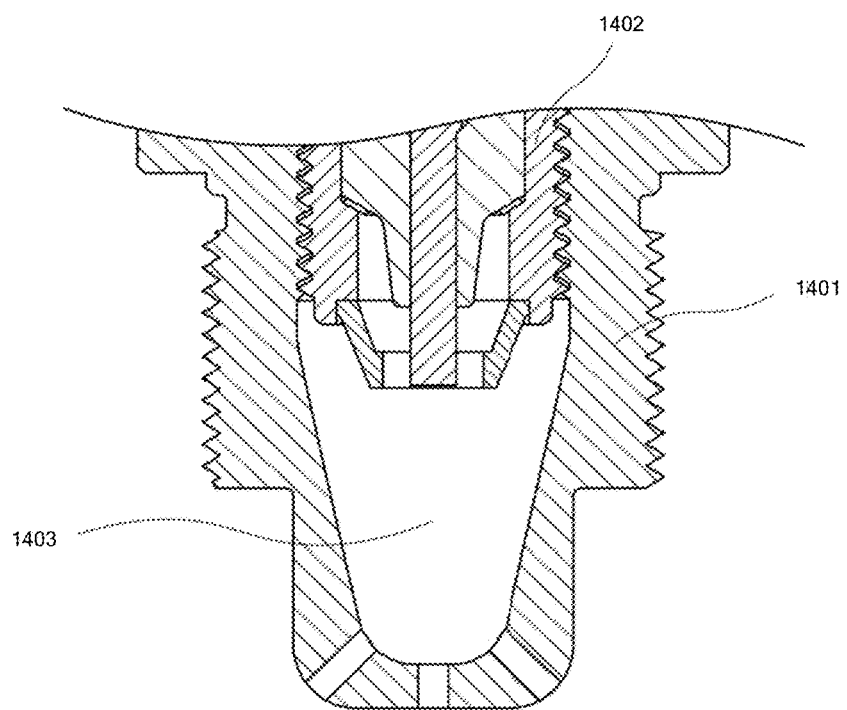
FIG. 14 depicts a permanent passive prechamber with removable spark plug for greater than about 60 MN fueled engines in accordance with certain embodiments.

In certain embodiments, FIG. 14 shows a permanent passive prechamber 1401 with removable spark plug 1402 for greater than about 60 MN fueled engines with a medium prechamber volume 1403 as compared to general configurations for the other types of fuels.

Figure 15:
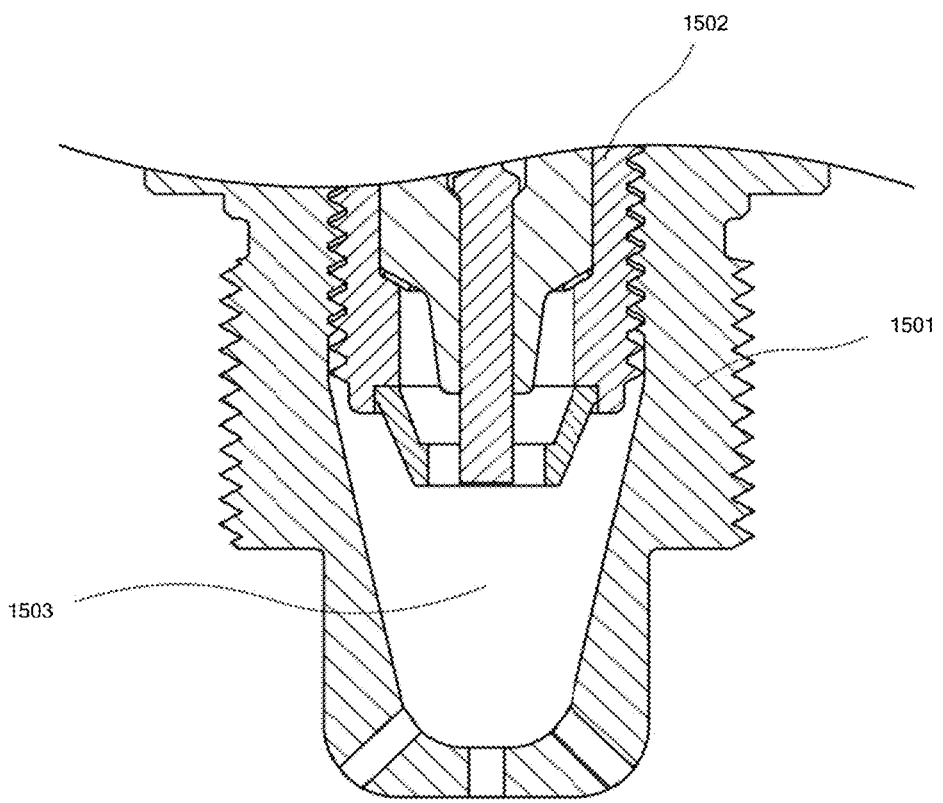
FIG. 15 depicts a permanent passive prechamber with removable spark plug for low MN fueled engines in accordance with certain embodiments.

In certain embodiments, FIG. 15 shows a permanent passive prechamber 1501 with removable spark plug 1502 for low MN fueled engines with a smallest pre-chamber volume 1503 as compared to general configurations for the other types of fuels.

Figure 16:
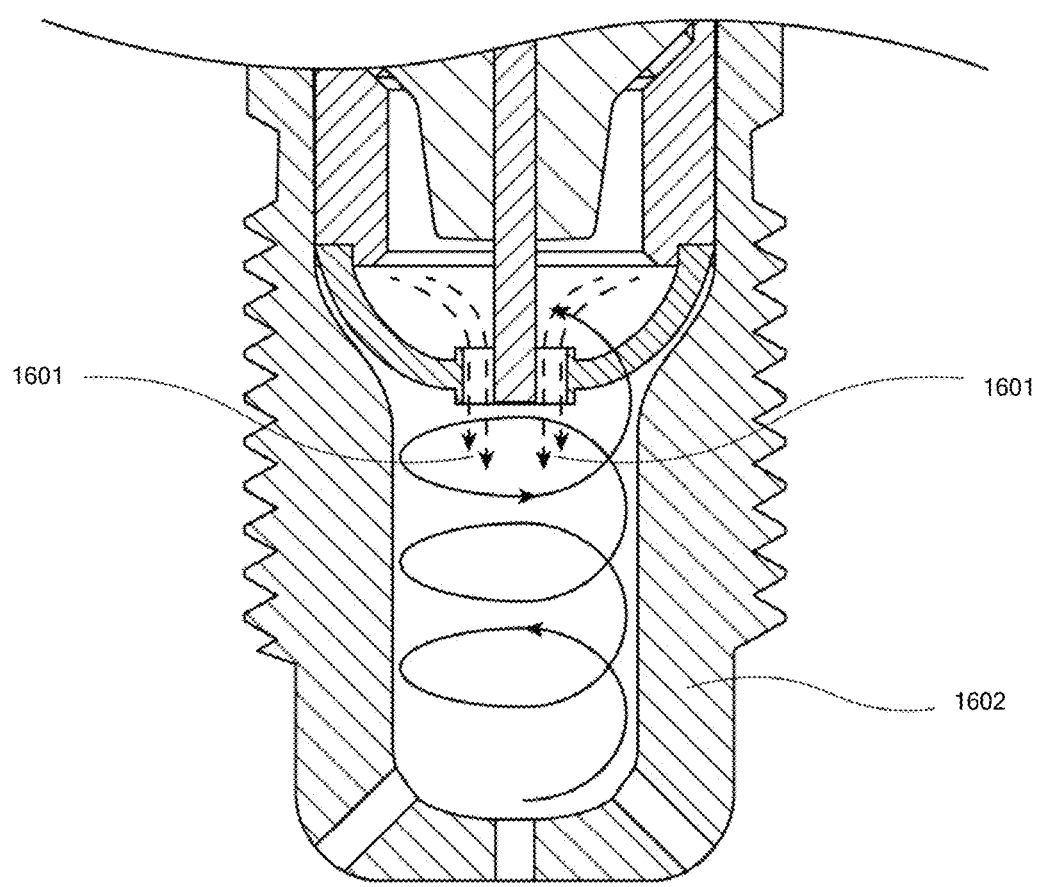
FIG. 16 depicts uniform flow velocity and magnitude in the gap of a forward flow prechamber spark plug in accordance with certain embodiments.

In certain embodiments, FIG. 16 shows uniform flow velocity and magnitude in the gap of a forward flow prechamber spark plug 1602. It also shows that the flow from the gap 1601 may be directed away from quenching surfaces and towards the prechamber exit orifices (holes).

Figure 17:
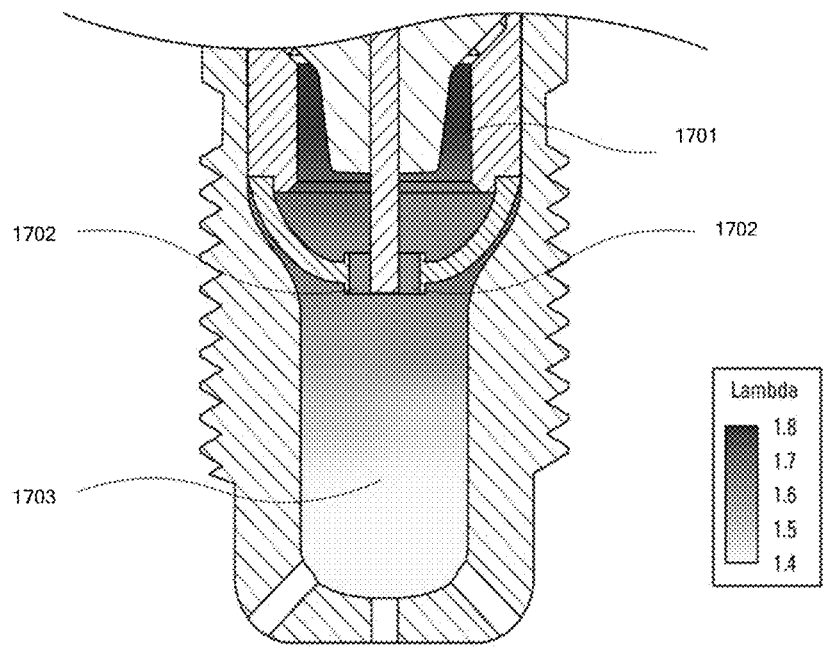
FIG. 17 depicts uniform Lambda distribution in the gap of a forward flow prechamber spark plug in accordance with certain embodiments.

In certain embodiments, FIG. 17 shows uniform Lambda distribution in the gap 1702 of a forward flow prechamber spark plug. It also shows Lambda stratification in the prechamber that is richer 1703 in the region between the gap and the exit orifices and leaner 1701 in the region comprised between the gap and the bottom of the prechamber.

In certain embodiments, the thermal dissipation characteristics of a selected combination of spark plug design and forward flow prechamber design may be optimized. The optimization may be determined by calculating the temperatures of the various elements defining the combination and the resulting effects on flame quenching, rate of combustion and the electrodes wear rate. In certain embodiments, the term "matching" may mean that the geometry of the prechamber, in terms of all its parameters such as volume, aspect ratio, holes' diameter, penetration angle, rotational offset and so on, may be arranged with the combined use of CFD and thermal finite element analysis (FEA) to create the most advantageous flow field and lambda distribution at the gap and within the prechamber while achieving optimum surface temperatures of the various elements constituting the spark plug and the prechamber. The term "most advantageous" may include one or more of the following characteristics:

The flow velocity in the gap may be uniform in magnitude and direction.
The magnitude of the flow in the gap may be less than about 50 m/s.
The flow from the gap may be directed away from quenching surfaces and towards the prechamber exit orifices (holes).
The flow in the prechamber may have an average turbulent kinetic energy greater than about 1 $m^2/s^2$.
The lambda distribution in the gap may be uniform.
The magnitude of lambda in the gap may be richer than about 2.5.
The lambda distribution in the prechamber may be richer in the region comprised between the gap and the exit orifices and leaner in the region comprised between the gap and the bottom of the prechamber.
The magnitude of the average lambda in the prechamber may be richer than about 2.5.
The inner walls of the prechamber may not exceed 900 C.
The ground electrode temperature may not exceed 900 C.
The center electrode temperature may not exceed 900 C.
The spark plug core nose temperature may not exceed 800 C.
The spark plug hot lock temperature may not exceed 300 C.
The spark plug roll over temperature may not exceed 300 C.
The prechamber end-cap temperature may not exceed 1000 C.

Figure 18:
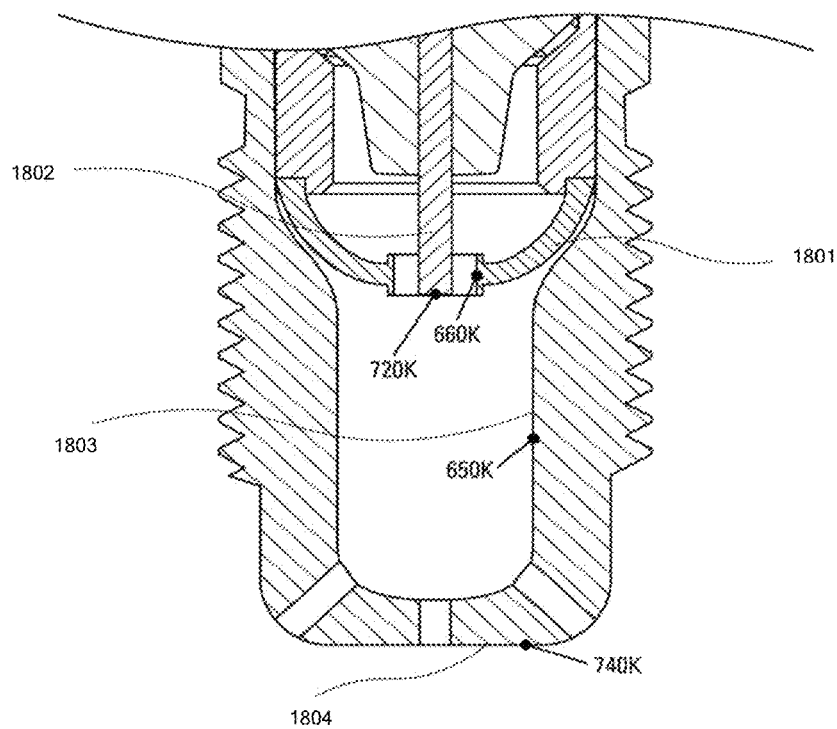
FIG. 18 depicts a temperature distribution in the major elements of a forward flow prechamber spark plug in accordance with certain embodiments.

In certain embodiments, FIG. 18 shows a temperature distribution in the major elements of a forward flow prechamber spark plug. Various temperatures may be achieved depending on the material used and type of construction. In certain embodiments, FIG. 18 shows ground electrode temperature 1801; center electrode temperature 1802; prechamber inner-wall temperature 1803; and prechamber outer-wall temperature 1804.

Figure 19:
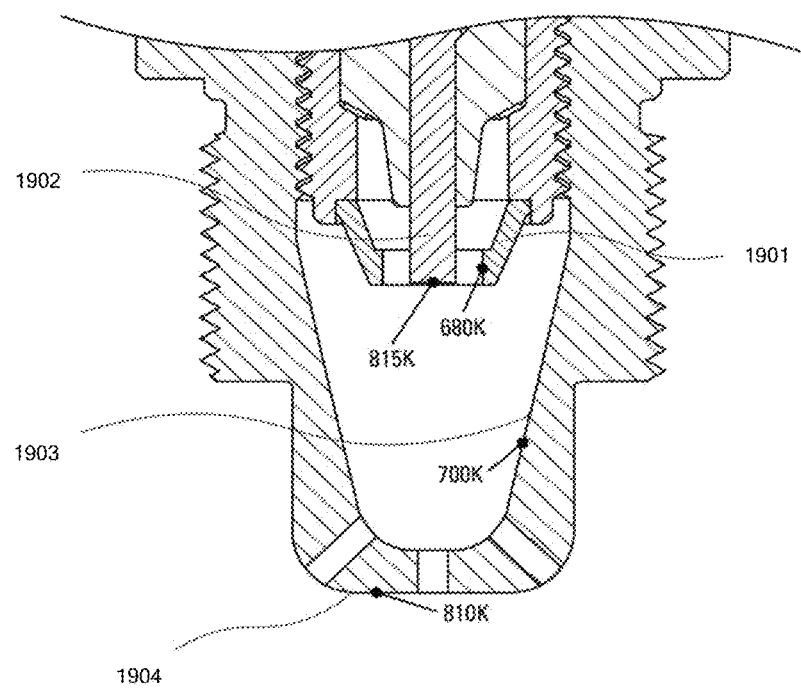
FIG. 19 depicts a temperature distribution in the major elements of a removable spark plug and permanent prechamber in accordance with certain embodiments.

In certain embodiments, FIG. 19 shows a temperature distribution in the major elements of a removable spark plug and permanent prechamber. Various temperatures can be achieved depending on the material used and type of construction. In certain embodiments, FIG. 19 shows ground electrode temperature 1901; center electrode temperature 1902; prechamber inner-wall temperature 1903; and prechamber outer-wall temperature 1904.

In certain embodiments, all the prechamber geometrical parameters may be arranged with the combined use of CFD and thermal FEA to create the most advantageous flow field and lambda distribution at the gap and within the prechamber, while achieving optimum surface temperatures. Below are some CFD and FEA examples.

Figure 20:
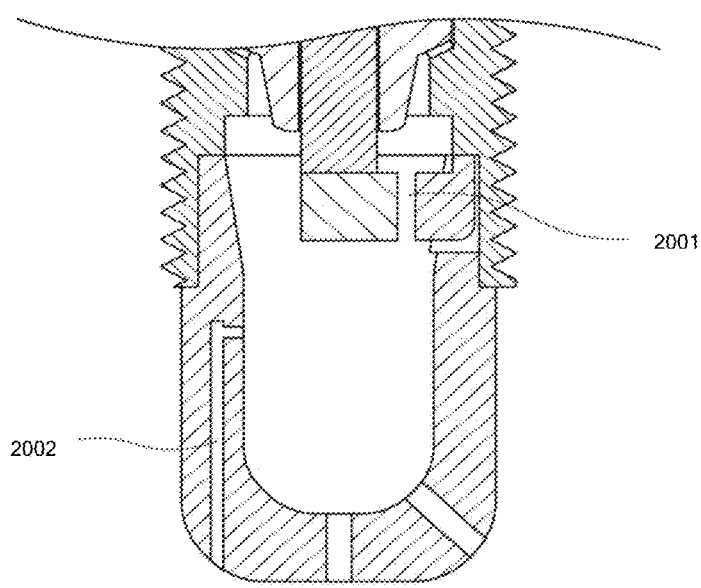
FIG. 20 depicts an active scavenge prechamber spark plug with a scavenging port located remotely from the radial gap in accordance with certain embodiments.
Figure 21:
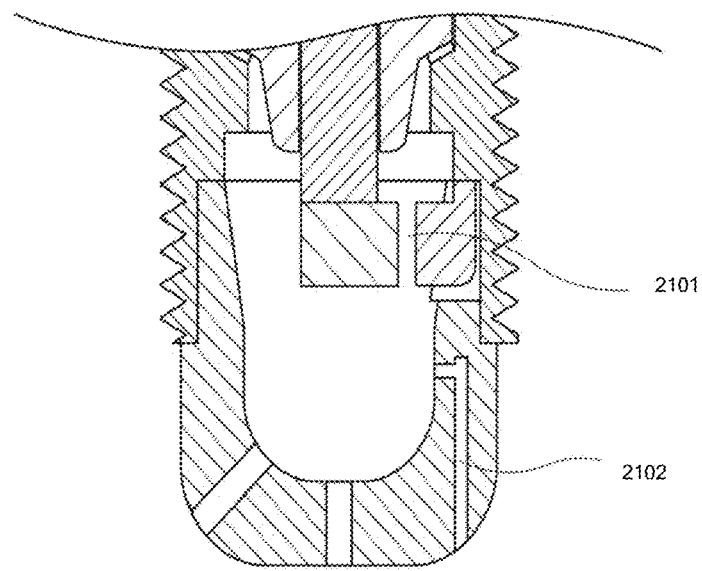
FIG. 21 depicts an active scavenge prechamber spark plug with a scavenging port located adjacent to the radial gap in accordance with certain embodiments.
Figure 22:
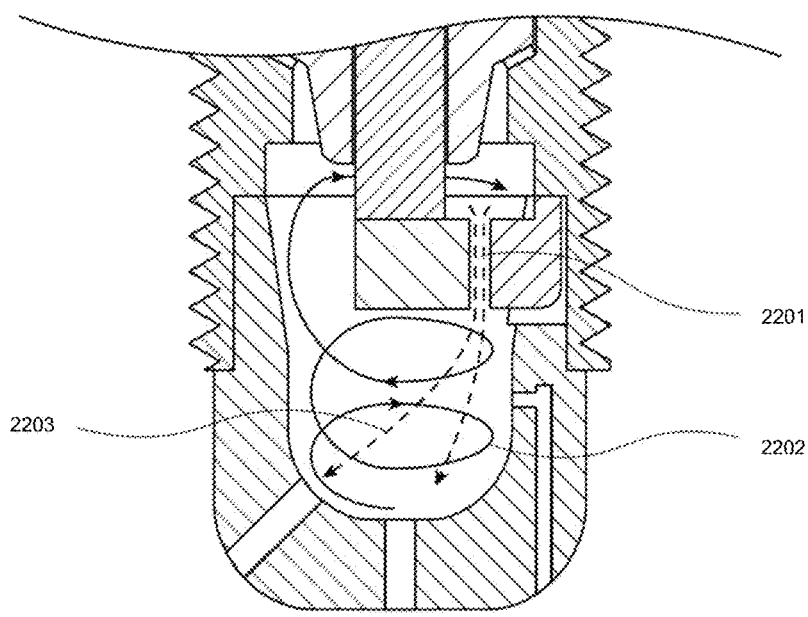
FIG. 22 depicts a flow velocity pattern and uniform magnitude in a single radial gap of an active scavenge prechamber spark plug in accordance with certain embodiments.
Figure 23:
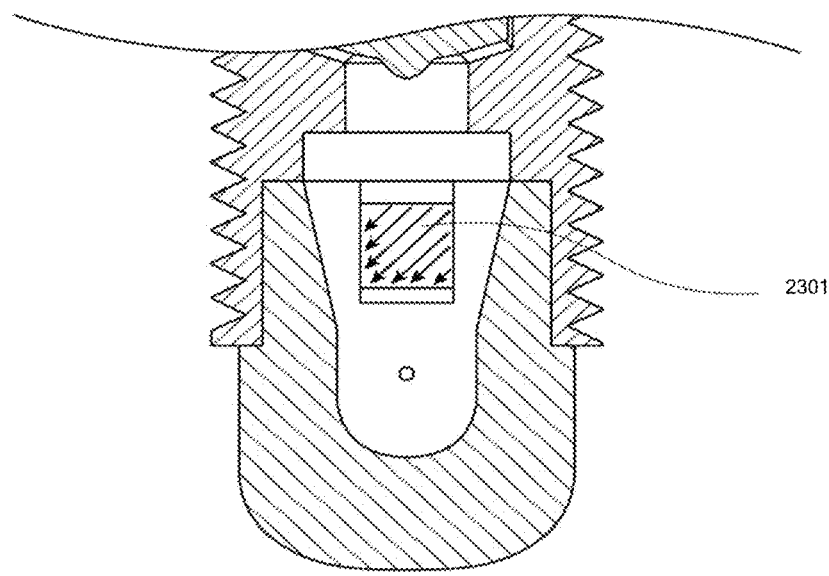
FIG. 23 depicts uniform flow velocity and magnitude (1501) in a single radial gap of an active scavenge prechamber spark plug in accordance with certain embodiments.
Figure 24:
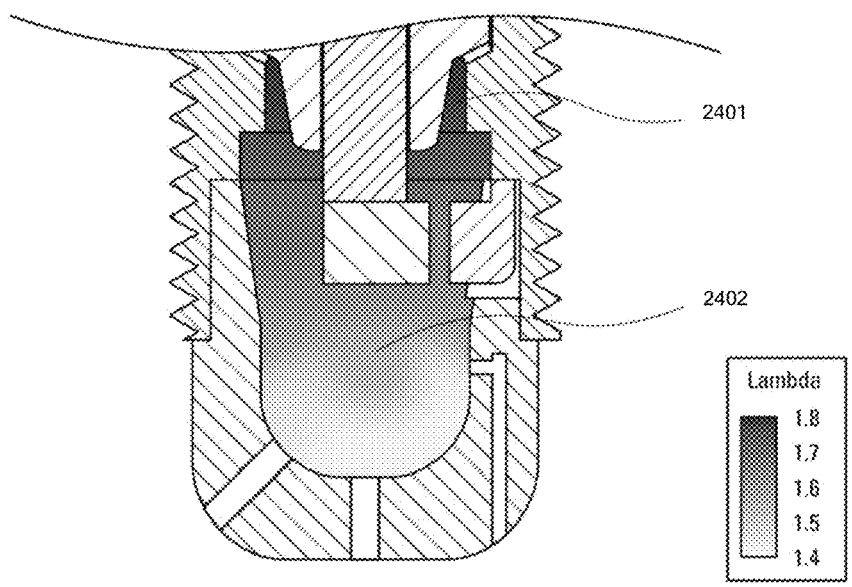
FIG. 24 depicts Lambda stratification in a prechamber in accordance with certain embodiments.
Figure 25:
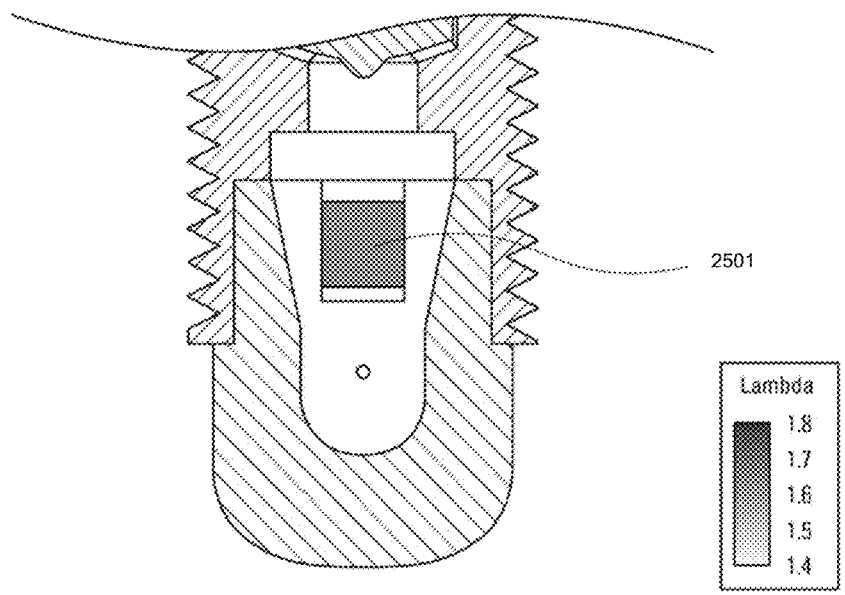
FIG. 25 depicts uniform Lambda distribution in the single radial gap in accordance with certain embodiments.
Figure 26:
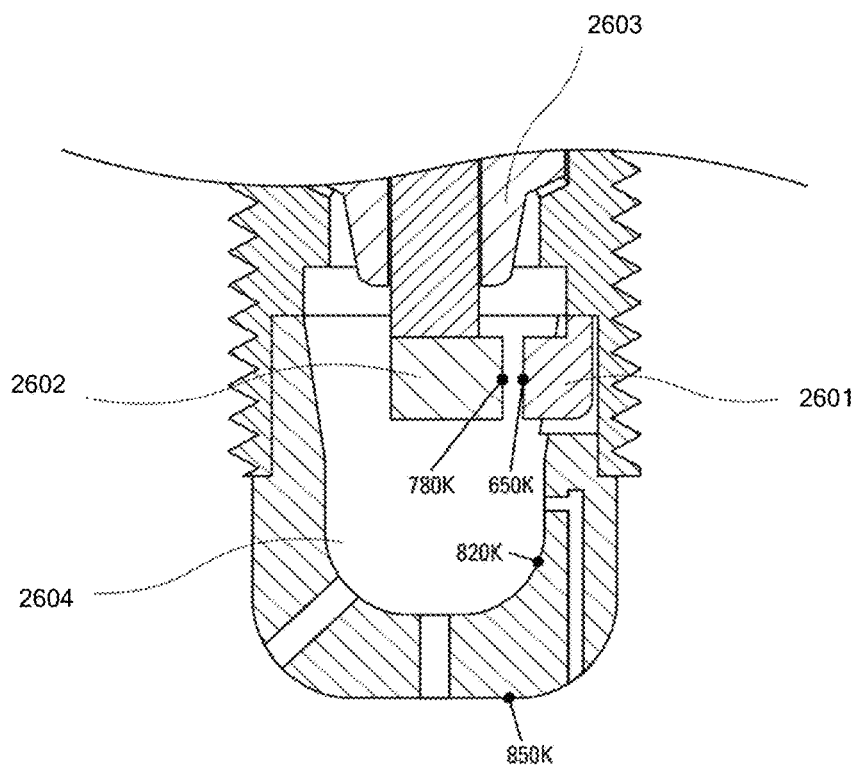
FIG. 26 depicts a temperature distribution in the major elements of an active scavenge prechamber spark plug with single radial gap in accordance with certain embodiments.

In certain embodiments, FIG. 20 shows an active scavenge prechamber spark plug with a scavenging port 2002 located remotely from the radial gap 2001. In certain embodiments, FIG. 21 shows an active scavenge prechamber spark plug with a scavenging port 2102 located adjacent to the radial gap 2101. In certain embodiments, FIG. 22 shows a flow velocity pattern 2202 and uniform magnitude in a single radial gap 2201 of an active scavenge prechamber spark plug. It also shows that the uniform flow from the gap 2201 is directed away from quenching surfaces and towards the prechamber exit orifices/holes 2203. In certain embodiments, FIG. 23 shows uniform flow velocity and magnitude 2301 in a single radial gap of an active scavenge prechamber spark plug. In certain embodiments, FIG. 24 shows Lambda stratification in a prechamber that is richer in the region 2402 comprised between the gap and the exit orifices and leaner in the region 2401 between the gap and the bottom of the prechamber. In certain embodiments, FIG. 25 shows the uniform Lambda distribution 2501 in the single radial gap. In certain embodiments, FIG. 26 shows a temperature distribution in the major elements of an active scavenge prechamber spark plug with single radial gap. Various temperatures can be achieved depending on the material used and type of construction. FIG. 26 shows pre-chamber spark plug 2603; center electrode 2602; ground electrode 2601; and pre-chamber volume 2604.

Figure 28:
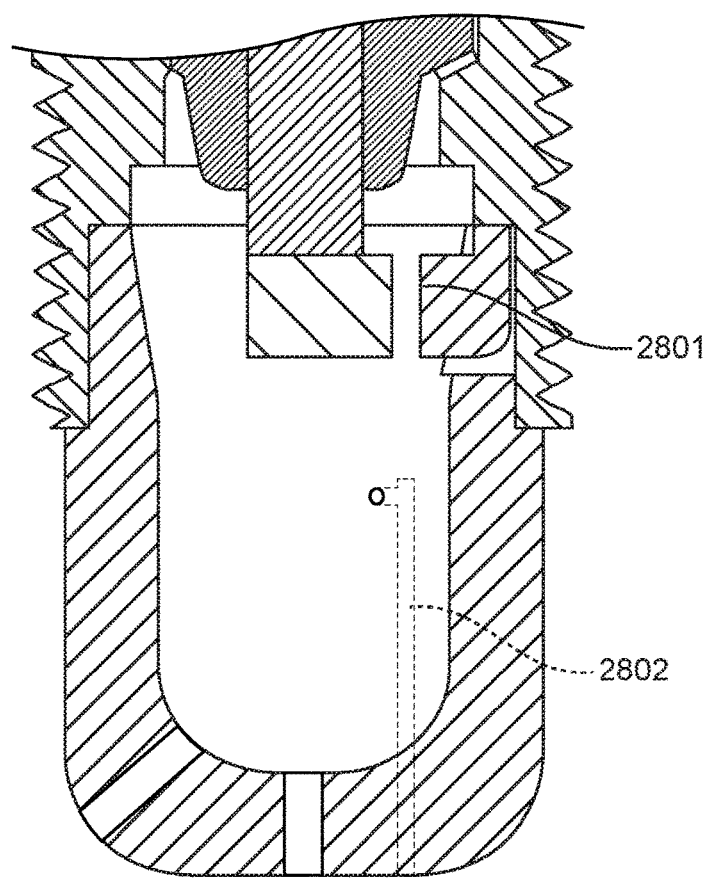
FIG. 28 depicts an active scavenge prechamber spark plug with a scavenging port located remotely from the radial gap in accordance with certain embodiments.
Figure 29:
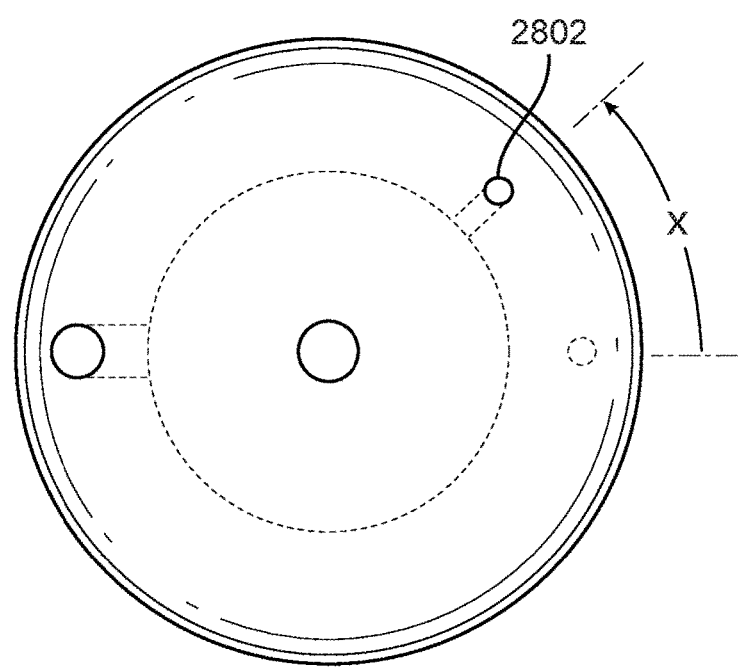
FIG. 29 depicts a horizontal cutaway view of the active scavenge prechamber spark plug of FIG. 28 with a scavenging port located remotely from the radial gap by an angle x in accordance with certain embodiments.

In certain embodiments, FIG. 28 shows an active scavenge prechamber spark plug with a scavenging port 2802 located remotely from the radial gap 2801. FIG. 29 depicts a horizontal cutaway view of the active scavenge prechamber spark plug of FIG. 28 with scavenging port 2802 located remotely from the radial gap 2801 by an angle x in accordance with certain embodiments.

Figure 27:
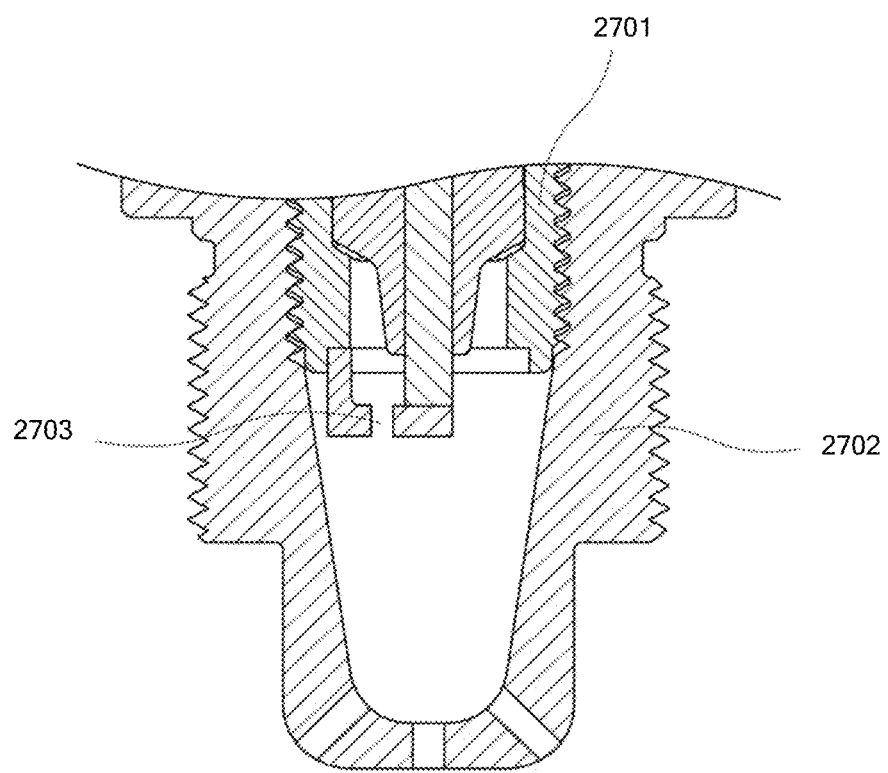
FIG. 27 depicts a removable spark plug with radial gap, screwed into a pre-chamber in accordance with certain embodiments.

In certain embodiments, a large electrode surface may be defined as larger than about 2 mm$^2$. For electrode surfaces greater than about 2 mm$^2$, it may be very difficult to achieve uniform flow velocities and lambda distributions. For example, an electrode surface of about 9 mm$^2$ may be used. With such a large electrode surface, the spark plug life may be greatly enhanced. This advantage may be achieved without substantial penalty to the ignitability performance, which may be assured by the uniform flow velocities and lambda distributions as described above. In order to achieve these conditions, the geometrical parameters of the prechamber may be arranged with the use of CFD and thermal FEA to create the most advantageous flow field and lambda distribution at the gap and within the prechamber while achieving optimum surface temperatures of the various elements constituting the spark plug and the prechamber. The ranges and criteria pertaining to flow fields, lambda distributions and temperatures may be the same as provided above. In certain embodiments, FIG. 27 shows a removable spark plug 2701 with radial gap 2703, screwed into a pre-chamber 2702.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. A pre-combustion chamber comprising:
a passive prechamber comprising:
a prechamber comprising an external surface and an internal surface enclosing a prechamber volume;
one or more ejection ports communicating between the external surface and the internal surface for introducing a fuel-air mixture into the prechamber volume;
one or more electrode gaps, comprising
a primary electrode disposed within the prechamber volume; and
one or more ground electrodes disposed within the prechamber volume and offset from the primary electrode to form one or more electrode gaps;
a crevice volume; and
one or more auxiliary scavenging ports each comprising an inlet for communicating with a main combustion chamber and an outlet communicating with the crevice volume;
wherein the one or more auxiliary scavenging ports each has an inlet axis defining an inlet angle and an outlet axis comprising an outlet angle; and
wherein the inlet angle is different from the outlet angle and the inlet angle is parallel to a longitudinal axis of the prechamber for generating a reduced flame jet momentum from combustion in the passive prechamber.

2. The pre-combustion chamber of claim 1, wherein the one or more ground electrodes comprises a single ground electrode offset radially from the primary electrode to form a single electrode gap and wherein the one or more auxiliary scavenging ports comprises a single scavenging port.

3. The pre-combustion chamber of claim 1, wherein the one or more ground electrodes comprise an electrode surface area greater than 3 mm$^2$.

4. The pre-combustion chamber of claim 2, wherein the pre-combustion chamber comprises an aspect ratio of length over diameter (L/D); and wherein for an L/D less than 2, the single electrode gap is radially aligned with the single scavenging port.

5. The pre-combustion chamber of claim 2, wherein the pre-combustion chamber comprises an aspect ratio of length over diameter (L/D); and wherein for an L/D greater than 2, the single electrode gap is aligned 180° radially apart from the single scavenging port.

6. The pre-combustion chamber of claim 2, wherein the pre-combustion chamber comprises an aspect ratio of length over diameter (L/D); and wherein for an L/D less than 5, the single electrode gap is aligned between 0° and 180° radially apart from the single scavenging port.

7. The pre-combustion chamber of claim 2, wherein the single ground electrode comprises an electrode surface area greater than 3 mm$^2$.

8. The pre-combustion chamber of claim 1, wherein the prechamber is configured to generate a flow velocity in the one or more electrode gaps of the spark plug that is less than 100 m/s when a fuel air mixture is ignited in the prechamber.

9. The pre-combustion chamber of claim 1, wherein the prechamber is configured to generate a uniform lambda distribution in the one or more electrode gaps of the spark plug when a fuel air mixture is ignited in the prechamber.

10. The pre-combustion chamber of claim 1, wherein the prechamber is configured to generate a lambda fuel air mixture richer than 2.5 in the one or more electrode gaps of the spark plug when a fuel air mixture is ignited in the prechamber.

11. The pre-combustion chamber of claim 1, wherein the prechamber is configured to generate a lambda fuel air mixture richer than 2.5 in a second region between the one or more electrode gaps of the spark plug and a bottom surface of the prechamber when a fuel air mixture is ignited in the prechamber.

12. The pre-combustion chamber of claim 1, wherein the prechamber is configured to generate an average lambda value richer than 2.5 in the prechamber when a fuel air mixture is ignited in the prechamber.

13. The pre-combustion chamber of claim 1, wherein the volume of the prechamber is between 1000 mm$^3$ and 6000 mm$^3$ for use with fuels with energy content greater than 800 BTU/ft$^3$.

14. The pre-combustion chamber of claim 1, wherein the prechamber has a total volume greater than 1000 mm$^3$ for use with fuels with energy content less than 800 BTU/ft$^3$.

15. The pre-combustion chamber of claim 1, wherein the prechamber has a total volume less than about 6000 mm$^3$ for use with fuels with Methane Number lower than about 60.

16. The pre-combustion chamber of claim 1, wherein the prechamber has a total volume between 1000 mm$^3$ and 6000 mm$^3$ for use with fuels with Methane Number greater than 60.

17. The pre-combustion chamber of claim 1, wherein the one or more auxiliary scavenging ports are configured for admitting fresh fuel-air mixture directly to the crevice volume of the passive prechamber.

18. The pre-combustion chamber of claim 1, wherein the one or more auxiliary scavenging ports have a length over diameter ratio greater than 1.

19. The pre-combustion chamber of claim 1, wherein the one or more auxiliary scavenging ports has a port axis parallel to a longitudinal axis of the prechamber.

20. The pre-combustion chamber of claim 1, wherein the one or more auxiliary scavenging ports are configured for inducing mixing of the fresh fuel-air mixture with residual gases in the passive prechamber.

21. The pre-combustion chamber of claim 1, wherein the one or more auxiliary scavenging ports are configured for generating a uniform flow within the spark-gap electrode assembly.

22. The pre-combustion chamber of claim 1, wherein the outlet of each of the one or more auxiliary scavenging ports is proximate the spark-gap electrode assembly.

23. The pre-combustion chamber of claim 22, wherein the outlet of each of the one or more auxiliary scavenging ports is proximate to the spark-gap electrode assembly to directly affect the flow fields into the crevice volume.

24. The pre-combustion chamber of claim 1, wherein the one or more auxiliary scavenging ports are configured for generating a reduced flame jet momentum from combustion in the passive prechamber.

25. A method of active scavenging, comprising:
providing a prechamber comprising:
an external surface and an internal surface enclosing a prechamber volume;
one or more ejection ports communicating between the external surface and the internal surface for introducing a fuel-air mixture into the prechamber volume;
a spark-gap electrode assembly, comprising:
a primary electrode disposed within the prechamber volume; and
one or more ground electrodes disposed within the prechamber volume and offset from the primary electrode to form one or more electrode gaps;
one or more auxiliary scavenging ports each comprising an inlet for communicating with a main combustion chamber and an outlet communicating with a crevice volume of the prechamber;
wherein the one or more auxiliary scavenging ports each has an inlet axis defining an inlet angle and an outlet axis comprising an outlet angle; and
wherein the inlet angle is different from the outlet angle and the inlet angle is parallel to a longitudinal axis of the prechamber for generating a reduced flame jet momentum from combustion in the passive prechamber;
introducing one or more fuel-air in-filling streams to the prechamber volume through the one or more ejection ports; and
introducing a spark across at least one of the one or more electrodes gaps to ignite the fuel-air mixture.

26. The method of claim 25, wherein the one or more ground electrodes comprises a single ground electrode offset radially from the primary electrode to form a single electrode gap and wherein the one or more auxiliary scavenging ports comprises a single scavenging port.

27. The method of claim 25, wherein the one or more ground electrodes comprise an electrode surface area greater than 3 mm$^2$.

28. The method of claim 26, wherein the pre-combustion chamber comprises an aspect ratio of length over diameter (L/D); and wherein for an L/D less than 2, the single electrode gap is radially aligned with the single scavenging port.

29. The method of claim 26, wherein the pre-combustion chamber comprises an aspect ratio of length over diameter (L/D); and wherein for an L/D greater than 2, the single electrode gap is aligned 180° radially apart from the single scavenging port.

30. The method of claim 26, wherein the pre-combustion chamber comprises an aspect ratio of length over diameter (L/D); and wherein for an L/D less than 5, the single electrode gap is aligned between 0° and 180° radially apart from the single scavenging port.

31. The method of claim 26, wherein the single ground electrodes comprise an electrode surface area of the pre-combustion chamber of greater than 3 mm$^2$.

32. The method of claim 25, wherein the prechamber is configured to generate a flow velocity in the one or more electrode gaps of the spark plug that is less than 100 m/s when a fuel air mixture is ignited in the prechamber.

33. The method of claim 25, wherein the prechamber is configured to generate a uniform lambda distribution in the one or more electrode gaps of the spark plug when a fuel air mixture is ignited in the prechamber.

34. The method of claim 25, wherein the prechamber is configured to generate a lambda fuel air mixture richer than 2.5 in the one or more electrode gaps of the spark plug when a fuel air mixture is ignited in the prechamber.

35. The method of claim 25, wherein the prechamber is configured to generate a lambda fuel air mixture richer than 2.5 in a second region between the one or more electrode gaps of the spark plug and a bottom surface of the prechamber when a fuel air mixture is ignited in the prechamber.

36. The method of claim 25, wherein the prechamber is configured to generate an average lambda value richer than 2.5 in the prechamber when a fuel air mixture is ignited in the prechamber.

37. The method of claim 25, wherein the volume of the prechamber is between 1000 $mm^3$ and 6000 $mm^3$ for use with fuels with energy content greater than 800 $BTU/ft^3$.

38. The method of claim 25, wherein the prechamber has a total volume greater than 1000 $mm^3$ for use with fuels with energy content less than 800 $BTU/ft^3$.

39. The method of claim 25, wherein the prechamber has a total volume less than 6000 $mm^3$ for use with fuels with Methane Number lower than 60.

40. The method of claim 25, wherein the prechamber has a total volume between 1000 $mm^3$ and 6000 $mm^3$ for use with fuels with Methane Number greater than 60.

41. The method of claim 25, further comprising introducing one or more fresh fuel-air in-filling streams to the crevice volume through the one or more auxiliary scavenging ports.

42. The method of claim 25, wherein the one or more auxiliary scavenging ports have a length over diameter ratio greater than 1.

43. The method of claim 25 wherein the one or more auxiliary scavenging ports has a port axis parallel to a longitudinal axis of the prechamber.

44. The method of claim 25, wherein the outlet of at least one of the one or more auxiliary scavenging ports is proximate to the one or more electrode gaps to directly affect the flow fields into the crevice volume.

45. The method of claim 25, wherein the one or more auxiliary scavenging ports are configured for generating a reduced flame jet momentum from combustion in the prechamber.

* * * * *